United States Patent [19]

Hansen et al.

[11] Patent Number: 5,315,692

[45] Date of Patent: May 24, 1994

[54] MULTIPLE OBJECT PIPELINE DISPLAY SYSTEM

[75] Inventors: Dennis D. Hansen, Glendora; Michael D. Sedlar, Walnut; James N. Clay, Jr., La Habra, all of Calif.

[73] Assignee: Hughes Training, Inc., Arlington, Tex.

[21] Appl. No.: 956,313

[22] Filed: Aug. 18, 1992

Related U.S. Application Data

[63] Continuation of Ser. No. 622,128, Dec. 3, 1990, abandoned, which is a continuation of Ser. No. 222,940, Jul. 22, 1988, abandoned.

[51] Int. Cl.$^5$ .............................................. G06F 15/62
[52] U.S. Cl. ..................................... 395/119; 395/152
[58] Field of Search ............................... 395/119-122, 395/152, 153, 133, 135, 161, 164-166; 340/729; 434/36, 43, 44

[56] References Cited

U.S. PATENT DOCUMENTS

| | | | |
|---|---|---|---|
| 4,107,780 | 8/1978 | Grimsdale | 364/521 |
| 4,209,832 | 6/1980 | Gilham et al. | 364/521 |
| 4,291,380 | 9/1981 | Rohner | 364/522 |
| 4,360,831 | 11/1982 | Kellar | 358/182 |
| 4,384,338 | 5/1983 | Bennett | 364/522 |
| 4,420,770 | 12/1983 | Rahman | 358/183 |
| 4,437,121 | 3/1984 | Taylor et al. | 358/160 |
| 4,463,380 | 7/1984 | Hooks, Jr. | 358/160 |
| 4,468,688 | 8/1984 | Gabriel et al. | 358/22 |
| 4,484,349 | 11/1984 | McCubbrey | 382/49 |
| 4,485,402 | 11/1984 | Searby | 358/160 |
| 4,489,389 | 12/1984 | Beckwith et al. | 364/522 |
| 4,645,459 | 2/1987 | Graf et al. | 434/43 |
| 4,805,121 | 2/1989 | Scott et al. | 364/522 |
| 4,825,391 | 4/1989 | Merz | 364/522 X |
| 4,835,532 | 5/1989 | Fant | 340/729 |

Primary Examiner—Heather R. Herndon
Attorney, Agent, or Firm—Wanda K. Denson-Low

[57] ABSTRACT

A computer-controlled imaging system for providing a realistic representation of a three-dimensional scene on a two-dimensional medium in which multiple objects, viewed from several aspects and which may be combined informing a scene, are stored in digital form on mass storage device is allocated amongst plural channels. A field-of-view computer controls the read out of the stored objects into a buffer memory where they become available for processing by a pipeline processor which is capable of warping the image in accordance with instructions from the field-of-view computer. These images in each channel are then arranged in an order of range from a viewer whereby more remote images are occluded by closer images. The images from all channels are then fed in raster scan format to a scene construction module where CGSI and special effects can be added to the composite scene prior to being fed to video display equipment.

8 Claims, 15 Drawing Sheets

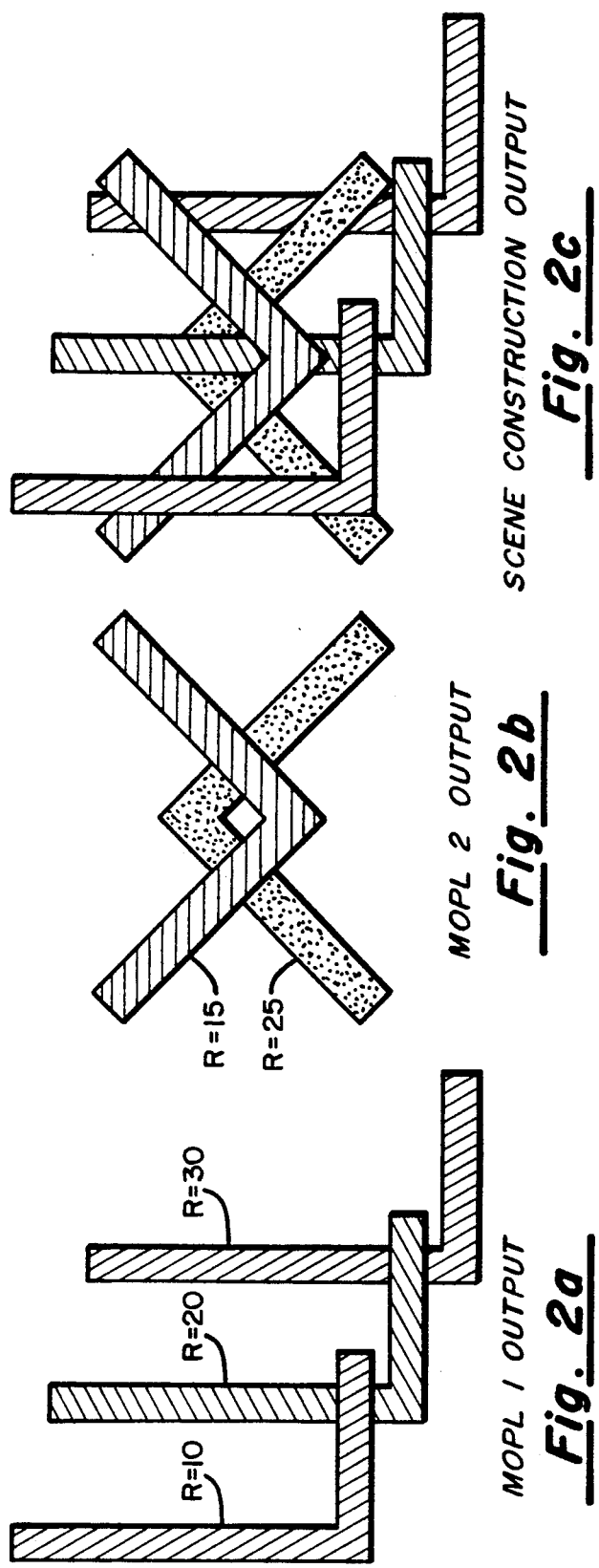

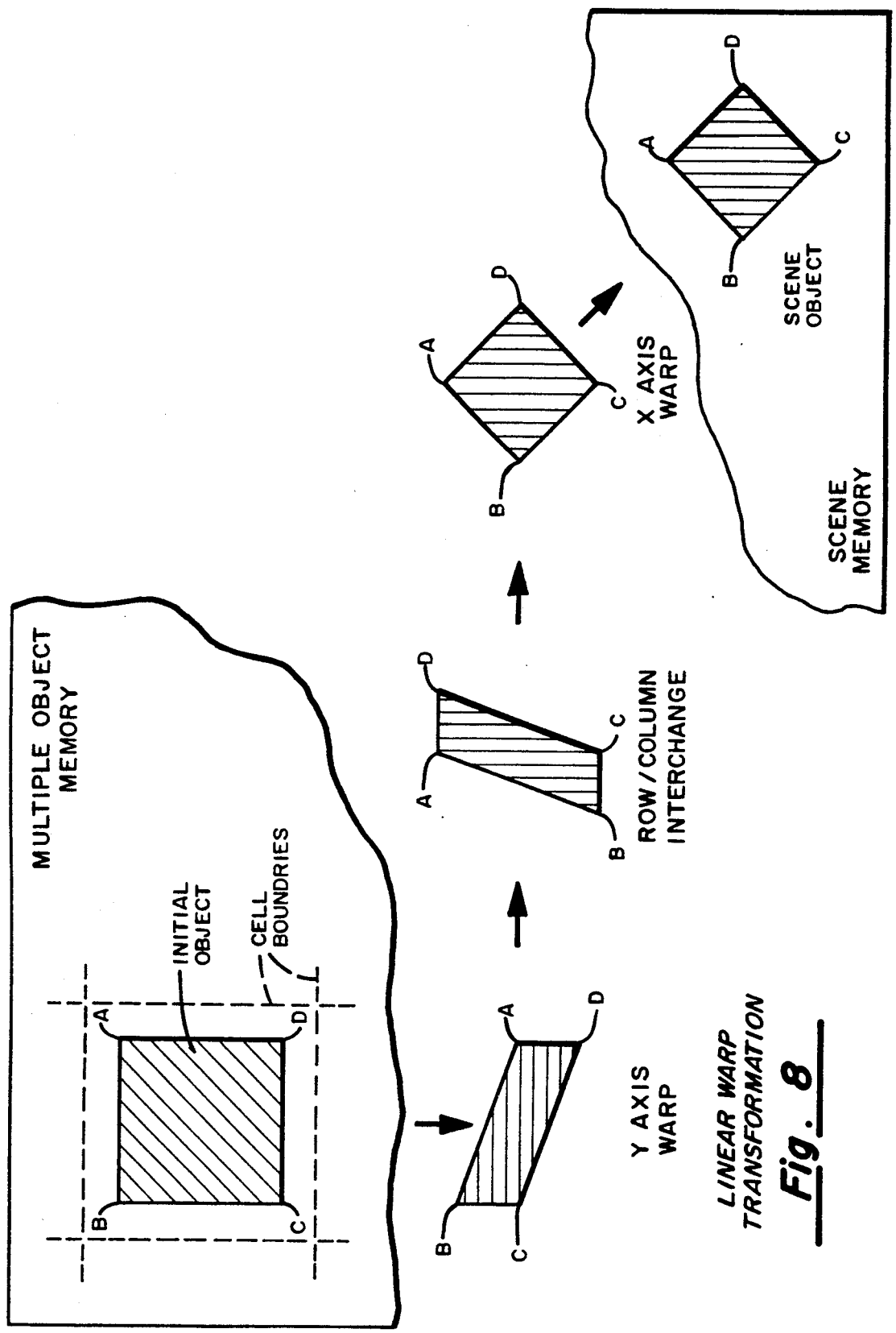

MULTIPLE OBJECT PIPELINE DISPLAY SYSTEM

This is a continuation of application Ser. No. 07/622,128 filed Dec. 3, 1990, now abandoned, which is a continuation of application Ser. No. 07/222,940 filed Jul. 22, 1988, now abandoned.

BACKGROUND OF THE INVENTION

I. Field of the Invention

This invention relates generally to a computer controlled imaging system, and more particularly to a system for creating realistic images of a three-dimensional scene on a two-dimensional medium wherein multiple objects can be simultaneously undergoing processing in plural channels.

II. Discussion of the Prior Art

Operators of complex vehicular systems, such as tanks, planes or ships, must receive extensive training to become proficient in their operation. It is common practice to rely on various types of system simulators in the training of these operators since it may be prohibitively costly and impractical to do this training on the actual vehicle. This is particularly true when training operators to respond to emergency or hazardous situations. For this training to be effective, it is highly desirable that all of the stimuli received from the training simulator be as close as possible to the actual stimuli provided by the vehicle itself.

The two dimensions of the realism of a visual image are its fidelity and its dynamics. Ideally, the display image should be indistinguishable from the view of a real image and should move smoothly in real time in response to actions taken by the vehicle operator. It is common practice to use various types of computer-generated imagery to provide this display. Such prior art systems are typically very expensive and still fall short of the ideal of high fidelity and smooth real-time dynamics.

This invention relates to a novel processing architecture referred to as "multiple object pipelined processor" to provide highly realistic synthesized imagery at a significantly lower cost and complexity vis-a-viz prior art systems.

A comprehensive discussion of a prior art animation system is contained in a Graf, et al U.S. Pat. No. 4,645,459, entitled COMPUTER GENERATED SYNTHESIZED IMAGERY. That patent is assigned to Honeywell, Inc. who was the assignee of the instant application until its assignment to Hughes Simulation Systems, Inc. effective Jan. 1, 1989. Graf describes "computer generated imagery" (CGI) in which the objects and surfaces for constructing video-displayable scenes are derived from purely mathematical models stored in the form of points, which define the limits of the objects and surfaces. Such mathematical models are readily manipulated by digital computers to efficiently provide excellent surface representation, accurate positioning in the scene, correct illumination and correct perspective. Although CGI is very strong in manipulation of scene objects, it is lacking in realism in that the object itself cannot be realistically presented. This causes the resulting scene to appear cartoonish, particularly in the representation of highly structured objects, such as trees, grass and detailed man-made objects.

Another known approach is so-called "computer synthesized imagery" (CSI). In contrast to the CGI approach where the digital computer constructs the image of the object, in CSI the object images are pre-recorded using a photographic process, or its equivalent, and then assembled into an object database which can be accessed by a digital computer. Very realistic scenes may be generated, providing that the database contains exactly the scene and perspective called for. A major weakness of this approach is that it is not practical for any complex system to store the very large number of camera viewpoints required. Such systems are thus somewhat unrealistic in that, although the objects portrayed may be true images, they are not appropriately sized, rotated and set in the proper perspective for the point of view required at any given instant. The aforereferenced Graf patent discloses an embodiment which combines the image manipulative strengths of CGI with the realistic portrayal of objects of CSI to form computer-generated synthesized imagery (CGSI).

With reference to FIG. 3 of the Graf patent, it depicts an implementation of a vehicle simulation system using a CGSI approach to generate the display. In this arrangement, a field-of-view computer is programmed to coordinate the display of a particular point of view based upon a vehicle attitude and position in the gaming area provided by the vehicle simulation computer. The gaming area database contains the identity and position of all objects in the gaming area, but not the image data of the object itself. All object image data is contained in the object library database which is shown as being replicated for each of the three processing channels. For each instance of every object to appear in the final scene, the field-of-view computer provides the object identity, its position and orientation that it must have in the final scene. The object controllers fetch the object images from the object library database and present them to the object processing channels which perform the required manipulations to fit the objects onto the scene. Identical processing channels are provided to process the surface and special effects associated with a given object.

FIG. 31 of the Graf patent shows a more detailed representation of the object processing channel. The object is received from the object database in analog video form and is converted by the analog-to-digital converter card 30 into a digital format where it is stored in the high-speed X/Y access memory 32. The preferred format in that embodiment has 512 lines, each line having 512 pixels and each pixel comprising an 8-bit word representing 256 intensity levels. The object image transformation is accomplished with a two-pass warp algorithm, a first pass to transform the object pixels of a given column into their correct row positions and a second pass to transform all pixels in a given row to their correct column position.

To accomplish this, image data is read from a memory 32 sequentially, in column-by-column order, and is passed through the look-up table card 34 to provide intensity modification to the image and then presented to the Y access warp card 36. The results of the Y access warp are stored in a high-speed X/Y access memory 38. The image is read from memory 38 in row order and presented to the X access warp card 40 for the second pass warp. The output of the X access warp is presented to the scene construction module of FIG. 3 of the Graf patent. The two pass warp process is shown graphically in FIG. 30 of the Graf patent. It shows a 512×512 pixel input imagery frame from the optical disk warped to be positioned on a 512×512 pixel video screen.

Given the equal size of the image frame with the resultant video screen, this warp accomplishes the combination of size rotation and position of the object on the video screen. In typical situations, most objects are relatively small compared to the size of the screen and Graf recognizes that it is generally inefficient to warp small objects from an input frame the size of the output scene. He thus suggests as a solution to divide the input frame into a fixed array, e.g., 4×4 of smaller input frames, each having independently programmed warp factors. With this approach, up to 16 small objects may be loaded into memory 32 and independently warped to the output screen. However, this solution does not address the problem of properly occluding these objects or translating them to their final preferred screen location.

While the CGSI approach taught by Graf provides a substantial improvement over the prior art in the generation of real-time realistic imagery, it is nevertheless limited in its ability to deal with highly dynamic scenes involving a very large number of objects. These limitations arise due to the maximum rate which objects may be accessed from a single object database and the maximum rate at which objects may be warped, given a single channel warp processor and the processing inefficiency associated with combining sizing, rotation, and positioning in a single warp process.

OBJECTS

It is, therefore, a principal object of this invention to provide an improved form of computer-generated synthesized imagery which improves the computational efficiency of the pipelined warp process.

It is a further object of the invention to provide a means to simultaneously warp objects in a multiplicity of pipelined channels.

It is a further object of the invention to conserve database storage and transfer bandwidth by dealing with objects of variable spacial resolution on a cell basis to provide a variable number of cells per object, i.e., a single cell for simple objects and a large number of cells to represent more complex, larger objects.

It is a further object of the invention to provide the ability to warp an adjustable number of objects.

It is a further object of the invention to provide the ability to translate each cell to its final preferred screen coordinates.

It is a further object of the invention to provide the ability to occlude one cell with another.

These and other objects and advantages of the invention will become apparent to those skilled in the art from the following detailed description of the preferred embodiment, especially when considered in conjunction with the accompanying drawing.

DESCRIPTION OF THE DRAWINGS

FIGS. 2a, 2b and 2c are used to illustrate a simple example of scene construction.

FIG. 8 illustrates diagrammatically the linear warp transformation procedure.

SYSTEM DESCRIPTION

Figure 1:
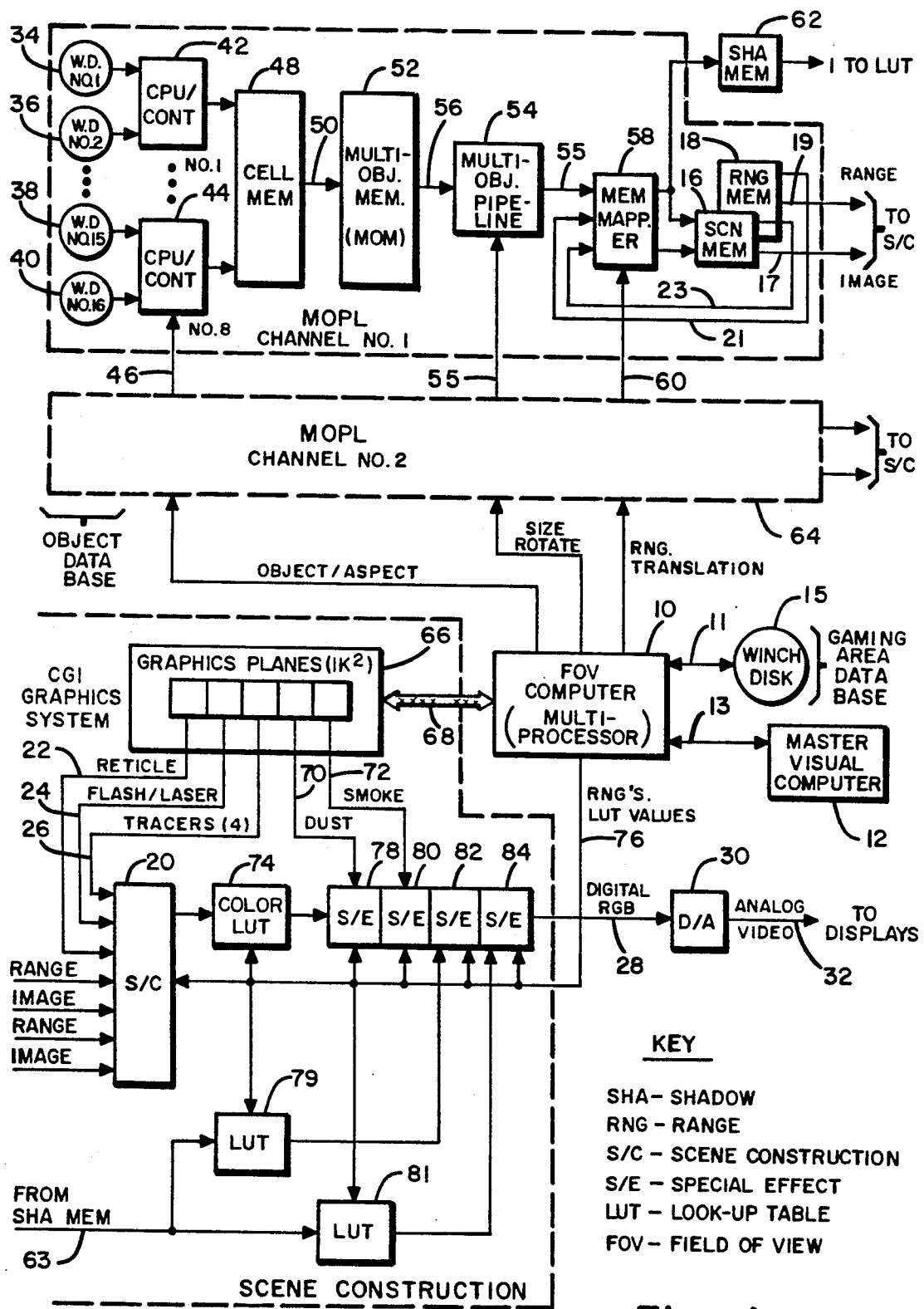
FIG. 1 is a top level block diagram of the multiple object pipelined display subsystem in accordance with the present invention.

FIG. 1 shows a top level block diagram of a video display system employing the Multiple Object Pipelined display subsystem (MOPL) of the present invention. It is intended that one or more of these subsystems would be employed in a vehicle trainer to provide the aforementioned realistic video display in response to operator actions and training scenario. It incorporates a field-of-view computer 10 which is preferably a multiprocessor-type computer implemented with multiple microprocessors which provide supervisory control for the display subsystem. The simulation scenario is controlled by a master visual computer 12 which communicates with the field-of-view (FOV) computer 10 over I/O data lines 13. The master visual computer 12 is configured to provide information regarding the position of the observer in the gaming area, the attitude of the viewing port, magnification of the viewer, positions of other maneuverable objects in the gaming area as well as any additional information required to generate special visual effects.

There are two types of data bases in the visual subsystem, namely, the object data base and the gaming area data base. The object data base is arranged to contain digitized images of such things as terrain patches, trees, bushes, buildings, targets and other similar objects required to describe the total gaming area of a photographic quality. The object data base is generated from photographs of individual real world elements, i.e., highly accurate models or artists' drawings. These are digitized and restored to correct for any incorrect edge or edge roll-off that may be present. This is achieved by controlled thresholding, intensity corrections (dropping out the background), color balancing and perspective normalization. Ground contact and height reference points are added. The "near perfect" objects, surfaces and special effects which are thus formed are stored on digital mass storage devices, such as Winchester-type disk drives 34, 36, 38, 40. The object data base thus contains all of the visual building blocks required to construct the scene to be simulated. Each three-dimensional object is stored with multiple points of view or aspects.

The data stored in mass storage system 15 and which is accessible by the field-of-view computer 10 over bus 17 describes the gaming area. This data base describes the position and orientation of each object in the gaming area. The field-of-view computer 10 determines the presence of objects, surfaces and special effects in the multi-spectral scenes under construction. This determination is based upon viewpoint information provided by the master visual computer 12. As will be explained in greater detail below, a transformation matrix is employed to convert gaming area coordinates to display screen coordinates. The data from the transformation matrix permit rapid testing to determine what portions of objects, surfaces and special effects will appear in the scene.

To avoid testing for the presence of all of the objects in the data base, a special algorithm tests only those objects and special effects that are in the proximity of the scene. The field-of-view processor 10 maintains a list of these objects and their multiple object pipelined (MOPL) processing channel assignment. For each object in the field-of-view, the field-of-view computer 10 computes the aspect, size, orientation, position and range of the object in the final scene.

Each MOPL operates on its assigned objects to produce a portion of the scene in its dedicated scene memory (SCN MEM) 16. These operations include sizing and rotating the object. Each MOPL manages the occlusion in its dedicated scene memory of all objects within its own set and maintains in range memory (RNG MEM) 18 the range of all unoccluded objects or portions of objects. The scene construction module (S/C) 20 combines the partial images from each MOPL into a complete image using the range information stored in each MOPL range memory 18 to perform the final occlusion and translation.

An example of scene construction is shown with the aid of FIGS. 2a–2c. In this simple example, MOPL #1 is assumed to generate three L-shaped objects at ranges, R, of 10, 20 and 30 units. FIG. 2(b) represents the output of MOPL #2 which contains two L-shaped objects at ranges of 15 and 25 units. It is to be noted that for each MOPL output, the foreground objects properly occlude the background objects. FIG. 2(c) shows the scene construction output which is the combination of MOPL #1 and #2 combined such that the complete set of objects are properly occluded.

Computer-generated imagery, such as a reticle, a flash/laser or tracers can be further combined in S/C module 20 to form a composite CGSI/CGI image by virtue of data sent from the CGI graphics image system over lines 22, 24 and 26, respectively. The digital output of the S/C module 20 is processed in a conventional manner, using look-up tables to develop a digital red/green/blue video signal which is passed through special effects modules and then converted to analog video by digital-to-analog converter 30.

To provide realistic (smoothly moving) dynamic imagery, it is desirable that the scene be updated each frame time. These update rates are best achieved through a combination of pipelining, i.e, specialized circuitry arranged in a sequential pipeline such that each element of the pipeline does one part of the operation and passes intermediate data onto the next element of the pipeline, in a parallel mode, wherein several pipeline channels are operated concurrently in time overlapped fashion.

In the preferred embodiment illustrated by the block diagram of FIG. 1, two parallel MOPL channels (Channel No. 1 and Channel No. 2) are shown. For purposes of simplification, only Channel #1 is illustrated in detail. However, it is understood that additional channels implemented substantially like Channel #1 may be added to accommodate any desired number of objects. It is further understood that any MOPL channel may be used to process objects, surfaces or special effects. In the preferred embodiment, the composite analog video signal on bus 32 has a raster scan format comprised of 960 lines, each line having 1024 resolvable spots or picture elements termed "pixels". Horizontal and vertical synchronization signals control the scan pattern of the display such that all 960 lines comprising one frame are scanned at a typical frame refresh rate of 50 hertz. This refresh rate is higher than the critical fusion frequency of a normal human observer, thus the resultant display appears without perceptible flicker.

Objects are stored in digital form in uniform packets called cells. Each cell is comprised of a total of 16,384 bytes of digital storage. Each byte corresponds to one pixel of the cell. The numerical value of each byte defines the video attributes, i.e., color and intensity of each pixel. Cells are arranged from a grid of 128 rows by 128 columns of pixels. Most objects are small enough to fit into a single cell. However, larger objects may be formed out of a combination of cells.

To gain an overview of this system operation, it is deemed expedient to follow the path of a single cell from its mass storage location to its position in the composite video signal on bus 32. Referring still to FIG. 1, each MOPL processing channel has a dedicated mass storage assembly containing the multiple aspects of each object that it may be called upon to process. This mass storage assembly is exemplified by Winchester-type disk drives 34, 36, 38 and 40, although other mass storage devices may also be adapted to this application.

A potential limitation to the high update rates sought by this invention is the transfer time of cells from the mass storage system. The object data base is spread over a multiplicity of drives in the preferred embodiment, e.g., 16 drives per processing channel, to allow concurrent transfer of objects, thus gaining throughput through parallelism. Each pair of disk drives has a microprocessor-based controller exemplified by CPU/control 42 and 44 in MOPL Channel No. 1.

The object data base feeds selected image data to the Multi-Object Memory (MOM) via the cell memory 48 which acts as a buffer. The MOM 52 may typically have a capacity of 96 cells each containing 128×128 pixels. With a typical disk transfer rate of 10 megabits/second, the time to transfer the contents of one cell is thus:

$$(128 \times 128 \times 8)/10^7 = 13 \text{ milliseconds}$$

The average total time to access and transfer one cell would then be as follows:

| | |
|---|---|
| Average seek time = | 30 milliseconds |
| Average latency = | 8 milliseconds |
| Data transfer time = | 13 milliseconds |
| Total | 51 milliseconds |

Each Winchester disk can, therefore, update the MOM at approximately 20 cells per second. One CPU/controller, as at 42, can handle two drives by overlapping the seek and transfer activities on the two drives. This is possible because the seek time exceeds 50% of the total time per transfer.

The 16 mass storage disks, therefore, can update a total of 16×20=320 cells/second in the MOM. This is equivalent to renewing all 96 cells at a rate of 320/96=3.3 times a second. For a 5-degree FOV it is thus possible to sustain a 16.7 degree/second angular rate when all objects in the FOV are completely different. However, many objects (particularly trees and bushes) can be used repeatedly as the scene changes by sizing and positioning the same basic image differently. Assuming that 50% of the cells do not need to be constantly updated, the object data base can support an angular rate of approximately 33 degree/second without loss of scene content. Above this rate, it is not possible for an observer to visually keep up with the scene detail so it is not significant if some objects are not present. In any event, objects will be prioritized according to their significance in the training exercise.

The MOM 52 has a capacity for 96 cells. At any instant, the contents of this memory comprise the visual repertoire required for a channel to compose its assigned portion of the resultant scene. The ordering of this cell data can be selected during the transfer from the cell memory 48 to the MOM 52 such that the cell is written to the MOM with any desired combination of left to right and top to bottom reversals. Thus, the cell is rotated to the correct orientation required for its position in the resulting scene.

All objects are stored at the highest magnification required such that all subsequent transformations involve a reduction in size. To map a cell into scene memory (SCN MEM) 16, it is accessed from the MOM 52, passed to the multiple object pipeline (MOPL) 54, via bus 56, at a video rate. The field-of-view computer (FOV) 10 defines the transformation in size and orientation (rotation limited to ±45° max.) to transform the cell to the final size and orientation required for the scene. The FOV computer 10 identifies the range of the cell and its X/Y position in the scene to memory mapper 58 via line 60. The memory mapper provides the coordinate transformation, such that the cell is written into scene memory 16 in a region corresponding to the correct X/Y coordinates of the display. For each pixel of the cell memory, mapper 58 compares the range for the scene corresponding to the pixel stored in range memory 18. If the new pixel has a range which is less than the current range stored in range memory 18, the new pixel is written to scene memory 16 and the cell range defined by the information on line 60 is written into range memory 18. In this way, cells of a lower range value overwrite cells of a higher range value to provide the proper occlusion. Further, the range information associated with each object is preserved in the range memory. This allows the partial scenes constructed by given MOPL channel 1-N to be combined with the outputs of other MOPL channels to creates a properly occluded complete scene.

So far it has been assumed that a cell is an actual object. It is to be understood, however, that the shadow cast by an object is also treated as a cell and processed up to this point in the manner previously described of an object itself. Shadow information is used somewhat differently in scene construction and must be written into a separate shadow memory 62.

Every two frame times, a new object can be transferred from MOM 52 to scene and shadow memories 16 or 62. As required, a single cell may be employed several times at different locations in the scene, e.g., a forest may be constructed using multiple copies of a tree object. Memories 16, 18, 62 are double buffered such that one-half of each memory can be used to construct a new scene while the other half of each memory can be sequentially read to generate the video signal required for the current actively displayed scene.

The digital inputs which define the composite video signal on line 32 are generated by sequentially reading memories 16, 18 and 62 in synchronism with each other, and in synchronism with corresponding memories of channel 2, that channel being identified by the broken line box 64, and synchronized to the aforementioned horizontal and vertical timing signals which define the scan pattern.

Also read in synchronism with the aforementioned memories is the computer-generated imagery graphics system memories 66. These memories may each comprise 1024×1024 arrays which are written into directly by a dedicated graphics multi-processor under the control of FOV computer 10, via data bus 68, to form special, highly dynamic objects which are best handled using conventional CGI computer graphics. Each computer generated image occupies a separate image plane as illustrated. Each plane is capable of outputting 8-bit pixels. The presence or absence of each image is determined by the data value of each pixel. The first image plane contains the reticles as indicated by the legend on line 22. The second defines the presence of a flash or a laser as reflected on line 24. The third plane defines tracers (line 26). The fourth plane defines the presence of dust (line 70), and the fifth plane defines the presence of smoke (line 72).

The scene construction (S/C) logic 20 determines, for each pixel, the 8-bit code to be presented to a color lookup table (LUT) 74. More particularly, the highest priority input is the reticle so that if line 22 has a data value greater than zero, then the reticle code is generated. Similarly, unique codes are generated if lines 24, 26 are active. If none of the computer-generated imagery lines are active, one of the two image pixels (MOPL outputs) is selected on the basis of a range comparison between channel 1 and channel 2. The channel select assures that the partial images from each channel are merged so that proper order of occlusion is maintained. The resultant 8-bit pixel code from the S/C logic 20 provides an address to the 256 word by 24-bit color lookup table 74. The outputs of the lookup table correspond to a 8-bit digital value for each of the primary colors, red, green and blue. Data loaded from the field-of-view computer 10 into color lookup table 74, via line 76, establishes a pallet of 256 colors which is sufficient to define a highly realistic scene. Special effects (S/E) modules 78 through 84 adjust the raw digital values of red, green and blue to provide the appearance of dust, smoke or shadow in a manner similar to that described in the aforereferenced Graf et al patent.

The adjusted digital values for red, green and blue are presented to the D/A converter 30 to generate analog voltages representative of the three primary colors. These analog signals are combined per the EIA standard RS 343 (modified for 50 Hz) to generate a composite color video signal on bus 32.

MULTIPLE OBJECT MEMORY

Figure 3A:
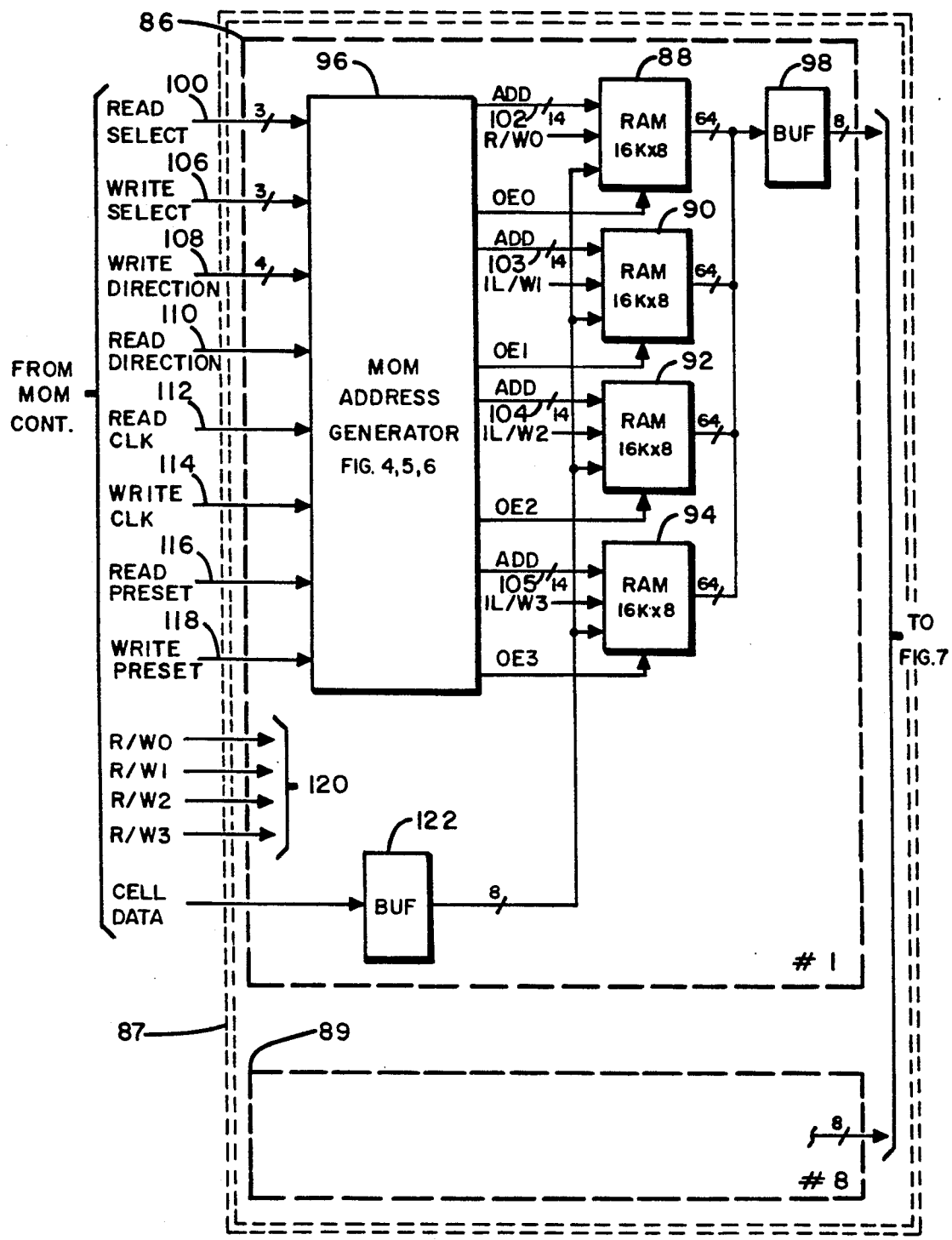
FIG. 3(a) shows the details of the memory array modules of the MOM.
Figure 3B:
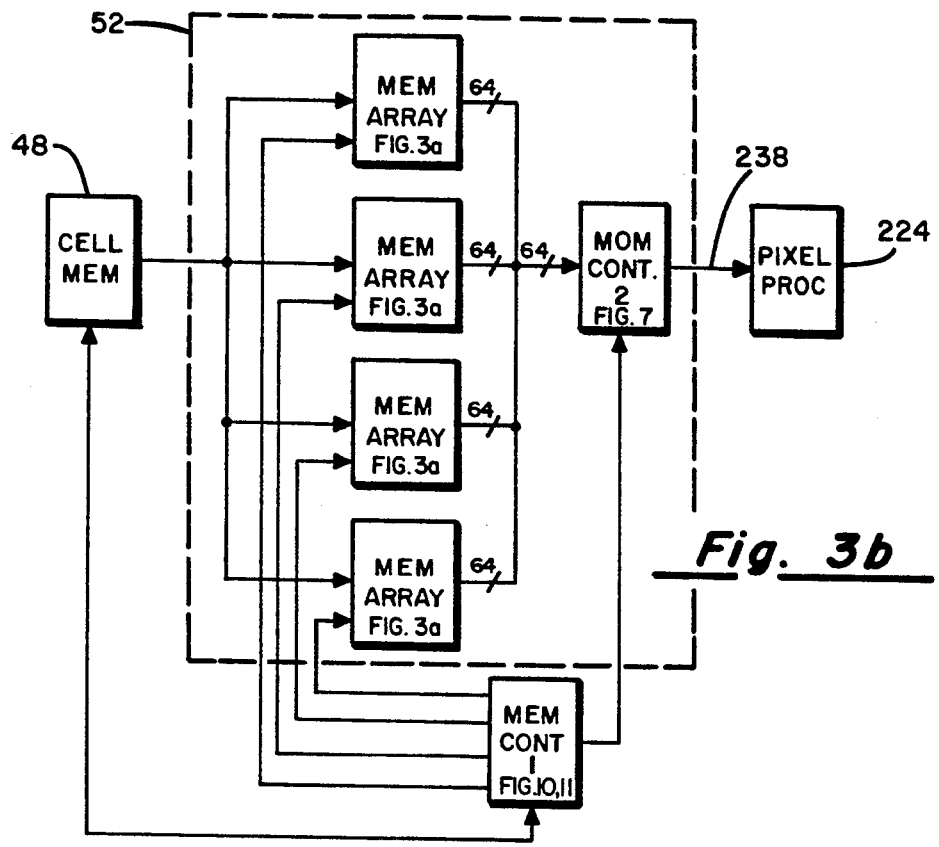
FIG. 3(b) is a block diagram illustrating the multiple object memory (MOM) of FIG. 1.

FIGS. 3(a) and 3(b) show more detailed logic diagrams of the hardware comprising the MOM 52 of FIG. 1. FIG. 3b illustrates the top level MOM 52 and its interfaces to the cell memory 48 and the pixel processor 224. This is preferably a semiconductor random access memory having two unique features. First, special hardware logic circuitry, which allows rapid transformation of the data as it is being moved from the cell memory 48 into the multiple object memory, is used to accomplish the aforementioned quadrant rotation. Second, a high-speed buffer memory, which provides an accelerated read-out rate to support the video data rates required for the pipeline processor, is employed.

The multiple object memory includes four identical sections of the type shown as being enclosed by the double broken line box 87. Each section then includes eight identical memory array modules 86-89. A memory array section, e.g., section 86, is comprised of four RAM memory chips, each having a capacity of 16,384 words by 8 bits. This is the capacity required to store one cell of 128 by 128, 8-bit pixels. Thus, the multiple object memory has a total capacity for more than 96 cells (4×8×4=128) so that MOM 52 may undergo address reassignment using pointers for input/output cells. Eight cells at a time are input from the cell memory 48, while 96 cells are output to the MOPL processor 54. As will be described in greater detail hereinbelow when the circuit FIG. 7 is explained, the MOM array is banked and "bank select" signals are used to access the desired bank, thereby increasing the system throughput. The data is then stored in line format in RAM memory and a capability is provided for "ping-ponging" to thereby allow concurrent read and write operations. Control of RAM chips 88 through 94 is provided by the MOM address generator 96, the details of which are set out in FIGS. 4, 5 and 6. It provides address and read/write control. In the preferred embodiment, address generator 96 may be either a gate array or a custom integrated circuit. Each of the MOM address generators receives control signals from a single MOM control unit which is a field line processor. The method of control enables automatic and concurrent transfer of data, via bus 232 (FIG. 9), from the cell memory to one of the MOM RAM chips while data is being transferred from another RAM chip to the MOM output buffer 98. Specifically, three "read select" lines 100 determine which of RAM chips 88 to 94 will receive a 14-bit read address over address buses 102-105. Similarily, three write select lines 106 are sufficient to determine which of the RAMS receive a 14-bit write address. The four write direction lines 108 and read direction lines 110 determine the order of address sequencing. A read clock provides timing pulses on line 112 to incrementally sequence the read address register while a write clock provides timing pulses on line 114 to incrementally sequence the write address register. Read preset 116 and write preset 118 provide control signals to initialize the read address counter and write address counter, respectively, to their initial values to begin a cell transfer based on the direction information provided by lines 108 and 110.

Read/write lines 120 provide write selection for RAM memory chips 88 through 94. During a write operation, cell data is presented to all of these chips, via buffer 122, however, only the chip selected as the target address will have its associated read/write line activated to cause a data transfer into the memory chip. Similarly, the outputs of RAM chips 88 to 94 are connected in parallel. Only the RAM chip which is selected for reading, via read select lines 100, will have the output enable signal activated to place data on the output. Data transfer from the cell memory to the multiple object memory is done on a pixel by pixel basis, i.e., 8 bits at a time. Cell data is interleaved among all eight sections of the memory array such that each RAM chip contains only one-eighth of the cell data. When data is read out of the MOM memory array, all sections similar to section 86 operate concurrently, each providing one pixel of an eight pixel word, i.e., 64 bits. This provides an 8 to 1 speedup in the transfer of data out of the memory array. This is an important feature in the performance of the system since cell data is written into the MOM only one time as it comes into the field-of-view but must be accessed every time the object is generated.

Figure 4:
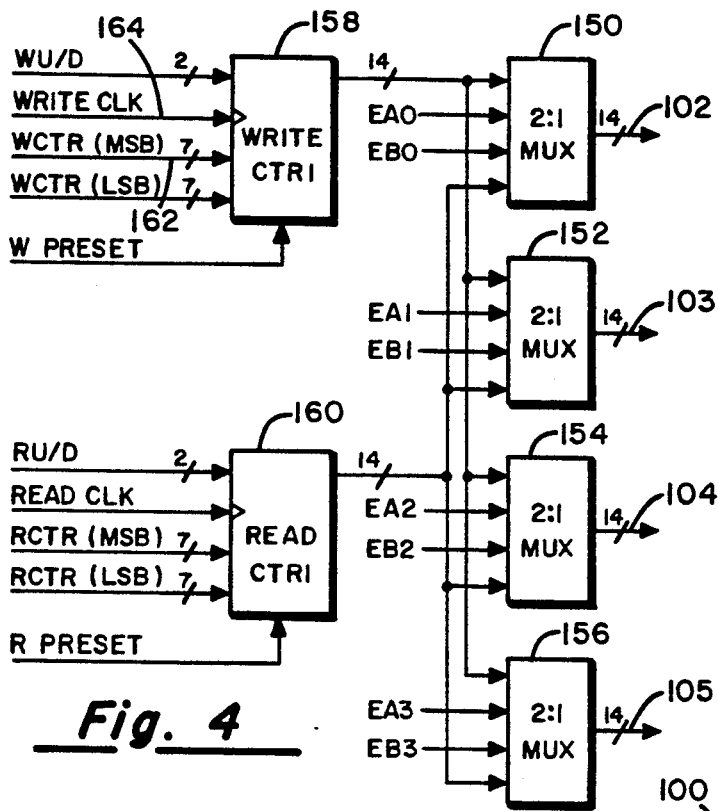
FIG. 4 is a detailed block diagram of the multiple object memory address generator.
Figure 5:
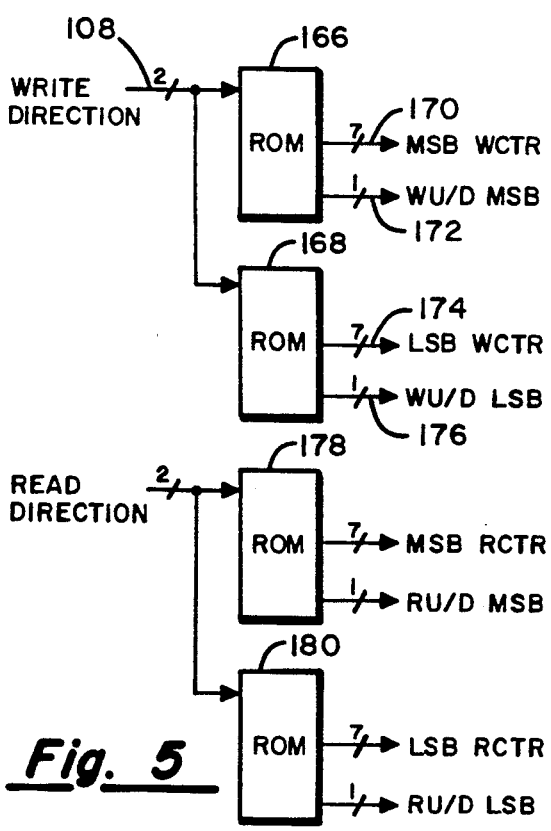
FIG. 5 illustrates the write and read direction logic for the MOM address generator of FIG. 3(a).
Figure 6:
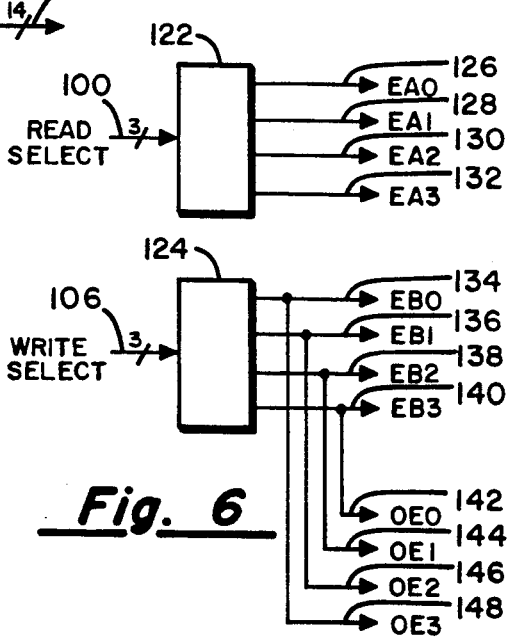
FIG. 6 illustrates the read/write select circuitry for use with the MOM address generator of FIG. 3(a).
Figure 7:
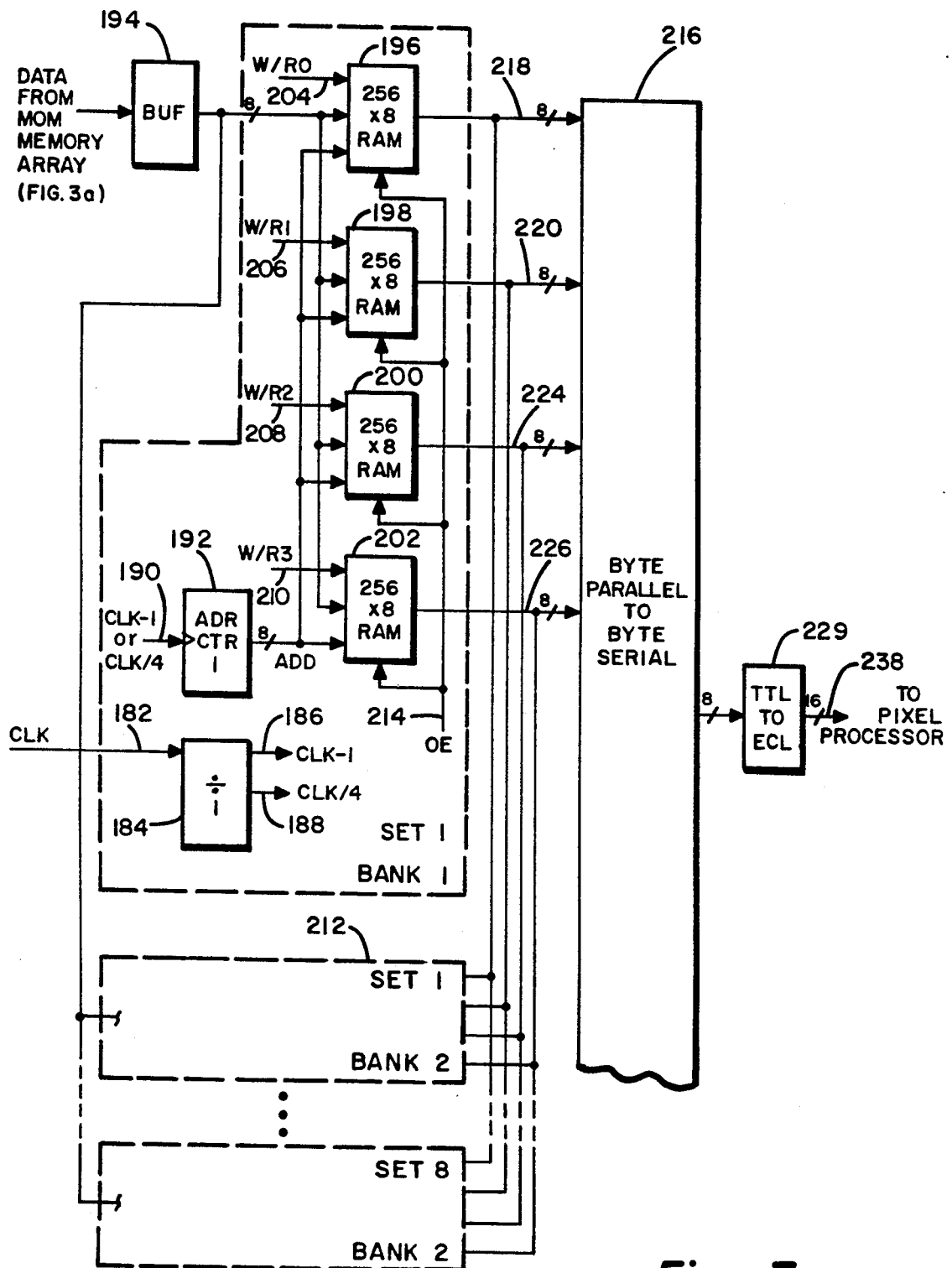
FIG. 7 is a logical block diagram representation of the RAM control circuitry for the multiple object memory, termed "MOM CONT. 2" in FIG. 3(b).

FIGS. 4-6 provide additional details of implementation of the MOM address generator 96 of FIG. 3a. As previously mentioned, the control signals 100 and 106 through 120 originate from a central MOM control unit. Demultiplexers 122 and 124 (FIG. 6) provide for selection of up to eight address control signals for read and write addresses, respectively. Read select signals 100 select one of the read address control lines 126 to 132 via multiplexer 122. Similarily, write select lines 106 select one of four write address control signals 134 to 140 which also provide the aforementioned output enable signals 142 through 148. Two-to-one demultiplexors 150 through 156 (FIG. 4) provide 14 bit addresses on buses 102 to 105 to MOM memory array RAM chips 88 to 94 of FIG. 3a, respectively.

The source of write addresses is MOM write address counter 158 (FIG. 4) while the source of read addresses is MOM read address counter 160. If read select lines 100 activate read address, the output of counter 160 will be provided as a read address to RAM memory chip 88 via mux demultiplexer 150. Activation of write address signal on line 162 routes the write address from counter 158 to RAM memory chip 88 (FIG. 3a). The central MOM control arbitrates read and write selection to assure that at no time is there is a concurrent selection of both read and write signals on any one multiplexor. MOM write address counter 158 may typically be comprised of two 7-bit presettable up/down binary counters. The least significant byte counter provides the lower order 7 bits of the 14-bit MOM address. It is cascaded to the most significant byte counter which provides the higher order 7 bits of the memory address such that either an overflow when counting up or an underflow when counting down causes the most significant byte counter to be clocked. The least significant byte counter is clocked by write clock signal applied via line 164. These counters thus correspond to the 128 bit columns and rows which comprise a cell.

As indicated in FIG. 5, write direction lines 108 provide an address to read only memories 166 and 168 which provide the preset values and count direction for both the most significant bytes and the least significant bytes of the counters on lines 170, 172, 174 and 176, respectively.

Since data is transferred from the cell memory in row-column order, the permutation of the address sequence achieved by individually controlling the presets and count directions of the row and column fields of the address results in a set of possible rotations as indicated in the table below.

| WRITE DIRECTION | CELL ROTATION |
| --- | --- |
| 00 | 0° |
| 01 | 180° |
| 10 | −90° |

-continued

| WRITE DIRECTION | CELL ROTATION |
|---|---|
| 11 | +90° |

MOM read address counter 160 has the identical structure. Read address counter 160 has the identical structure of counter 158 and is similarly controlled by read only memories 178 and 180 in response to read direction signals 110. It is thus possible to perform independent rotations of the cell image in 90° increments during the transfer from the cell memory into the multiple object memory, i.e, write, and the transfer from the multiple object memory to the pipeline processor, i.e, read. By providing for rotation during a write, the need to reload the image from cell memory 48 to achieve successive rotations is obviated.

"MOM control 2" shown in FIG. 7 provides a high-speed double buffered output for the MOM memory, allowing cells to be placed anywhere in any given line. It is comprised of 64 high-speed RAM memory chips, each 256 words by 8 bits. It is organized as 8 identical sets of memory, each set having two banks and each bank containing four memory chips. All eight sets function concurrently during both read and write operations. During a write operation, data is transferred from the MOM memory array with each eight bit bytes of the 64-bit MOM memory array output going to a different set of the memory. The operation of the output buffer is timed by a high frequency clock applied to line 182. This is divided by counter 184 to provide a lower frequency clock on lines 186 and 188 which is used during output (read) or for input (write), respectively.

The control mode selects either the read or write clock for the clock input 190 of address counter 192. A new pixel of data is presented to each bank from the MOM memory array, via buffer 194. Data is presented simultaneously to RAM memory chips 196 through 202. Write control lines 204 through 210 are sequentially activated to cause the four consecutive pixels of data from the MOM memory to be sequentially written to RAM memories 196 through 202. The corresponding write control lines of bank 212 are sequentially enabled to cause the odd pixels to be written into the corresponding memory chips of that bank. Thus, during a single address cycle, eight interleaved pixels of data are written into each of eight sets of two banks of the output buffer memory. This corresponds to 64 pixels. Counters in each bank of each set are then incremented to write another 64 pixels and this process is completed 256 times to write the entire cell.

During buffer output, the read clock 186 is used to increment address counter 192. During a first portion of the cycle, output enable 214 is activated to present the outputs of RAM memory chips 196 through 202 to the byte parallel to byte serial converter 216. During a second portion of the cycle, the corresponding output enable of bank 2 presents the data from the corresponding RAM memory chips over the same input lines 218 through 226 to converter 216. All eight sets operate concurrently such that at fixed intervals a new 32 byte wide word is presented to converter 216. Converter 216 converts the parallel format to a byte serial format at a 40 MHz rate. It transmits the data to the pixel processor via buffer 229. In summary, then, the multiple object memory provides an intermediate storage for the cells instantaneously required for scene generation and provides a structure which accelerates the data rate from the input to the output of the memory. Data is transferred into the memory, pixel by pixel, at a predetermined rate (320 cells/sec. max.) and exits from the output buffer of the MOM at a 40 MHz rate corresponding to 2441 cells per second.

MULTIPLE OBJECT PIPELINE PROCESSOR

As each cell object passes through the MOPL processor, a linear warp transformation is performed which shrinks the image to the required final size and rotates the image within a range of plus or minus 45° as required for proper orientation in the final scene. The linear warp algorithm is described in the Graf U.S. Pat. No. 4,645,459. A more detailed definition is provided in IEEE (CG&A, March '86, pp. 66-78).

FIG. 8 shows a graphical representation of the linear warp transformation process. Graphically, the multiple object memory can be considered as a series of panes, each pane containing a 128 by 128 pixel object. The initial object shown in the multiple object memory is a square with the corners A, B, C and D indicated. It is desirable that the initial object be smaller than the cell boundaries by an amount that assures that no possible required transformation will require the object to exceed the cell boundaries and thereby require clipping. In this example, it is desired that the initial object be transformed into a scene object which is reduced in size by 50% and rotated 45°. This object is then positioned at the desired X/Y coordinates by the scene memory. The first step in the transformation process is the Y axis warp. The warp is done on a column-by-column basis, starting from the left and proceeding to the right. Within each column, the position of each pixel is adjusted such that each pixel is now positioned in a row which corresponds to the desired final column. Sequential data in column/row order is written into an intermediate memory. When this memory is addressed to read the data into the next stage of the pipeline, it is read out in row/column order. The interchange of row and column order results in an effective 90° rotation of the object such that all pixels are now aligned in the desired column. However, due to this transformation, the columns are now the X axis and the rows are the Y axis. Hence, the X axis warp is the identical process to the Y axis warp, i.e., pixels are adjusted on a column-by-column basis to be positioned into the correct row. The completely warped object is transferred from the MOPL to the scene memory, via the memory mapper, which provides the appropriate address bias to correctly position the object in the X/Y plane of the scene.

Figure 9:
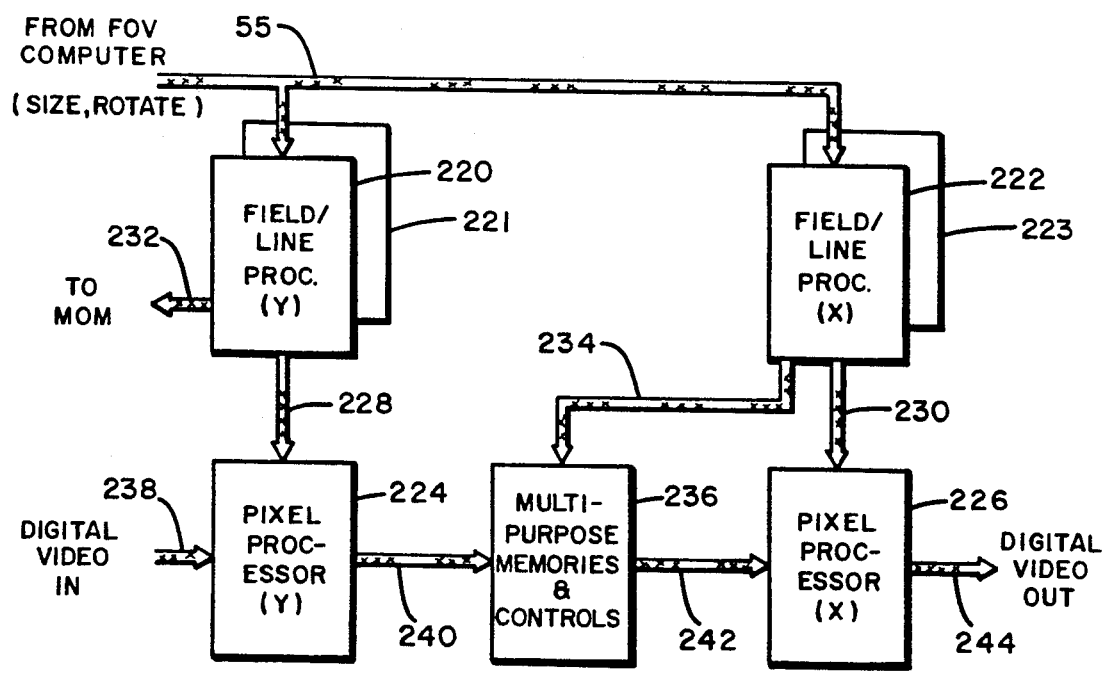
FIG. 9 is a general block diagram illustrating the multiple object pipeline processor for performing the linear warp transformation.

FIG. 9 shows a block diagram of the multiple object pipeline processor which executes the linear warp transformation depicted diagrammatically in FIG. 8. The X and Y field/line processors 220 through 223 interface to the field-of-view computer via data bus 55, preferably an IEEE standard 488 bus. The field-of-view computer provides the size and rotation parameters required for the warp process on an object-by-object basis. Both processors perform their computations with the same data from the field-of-view computer and thus have the same 488 interface listener address. With four F/L processors, each processor ping-pongs on a per cell basis to allow the current line/frame parameters to be calculated during the previous cell time. Data from the FOV computer 10 is updated at the video field rate, i.e., 50 Hz, which enables a new object to be warped for each field during each field time. For each object to be warped, the field/line processors 220 through 223 compute parameters required for the warp transformation and transfer these parameters to their respective X and Y pixel processors 224 and 226, via data buses 228 and 230, respectively. Computation and transfer is done during the field vertical blanking period and then remains constant for the processing of the next field. Concurrent with data transfers on buses 228 and 230, the field line processors 222 and 223 transfer parameters via bus 234 to multi-purpose memory 236 to control the addressing of data being read from this memory. Input data for the Y pixel processor 224 is provided by the MOM via data bus 238. The field line processor controls read addressing of the MOM via bus 232. Recall that each pixel in the initial object is assigned a new X and Y coordinate in the transformed object space. Data arrives on a pixel serial basis at an approximate 40 MHz rate in column/row order and each pixel in sequential top to bottom, left to right order. It is assembled in a line (column) buffer. This buffer is read out in a transformed order per the address data, per the pixel Y address data provided by line processor 220 and 221, via data bus 228. Thus, the output of pixel processor 224 on data bus 240 is a 40 MHz video data stream of the Y transformed data which occurs two line times later than the input data 238 (FIG. 7). Warp parameters passed by processors 220 and 221 which remain constant for an entire field are transferred during the vertical blanking period of the previous field while parameters which change line-by-line are transferred concurrent with the processing of the previous line.

Field line processors 222 and 223 and pixel processor 226 are identical to field/line processors 220 and 221 and pixel processor 224, respectively, differing only that they operate in the X axis warp rather than the Y axis warp. To do this, multipurpose memory 236 must be read out in row/column order. This is accomplished by address signals from processors 222 and 223, via address bus 234. Data on bus 242 is also a 40 MHz video data stream differing from input data on bus 240 only in the interchange of row and column and occurring one frame time later. That is, while the current frame is being read from memory 236, the next cell is being written in a double buffered fashion. The result is a fully pipelined video transformation process. Objects are sequentially entered into the processor on data bus 238 at a video rate and exit after an approximately one frame delay at the same video rate but transformed on data bus 244.

Figure 10:
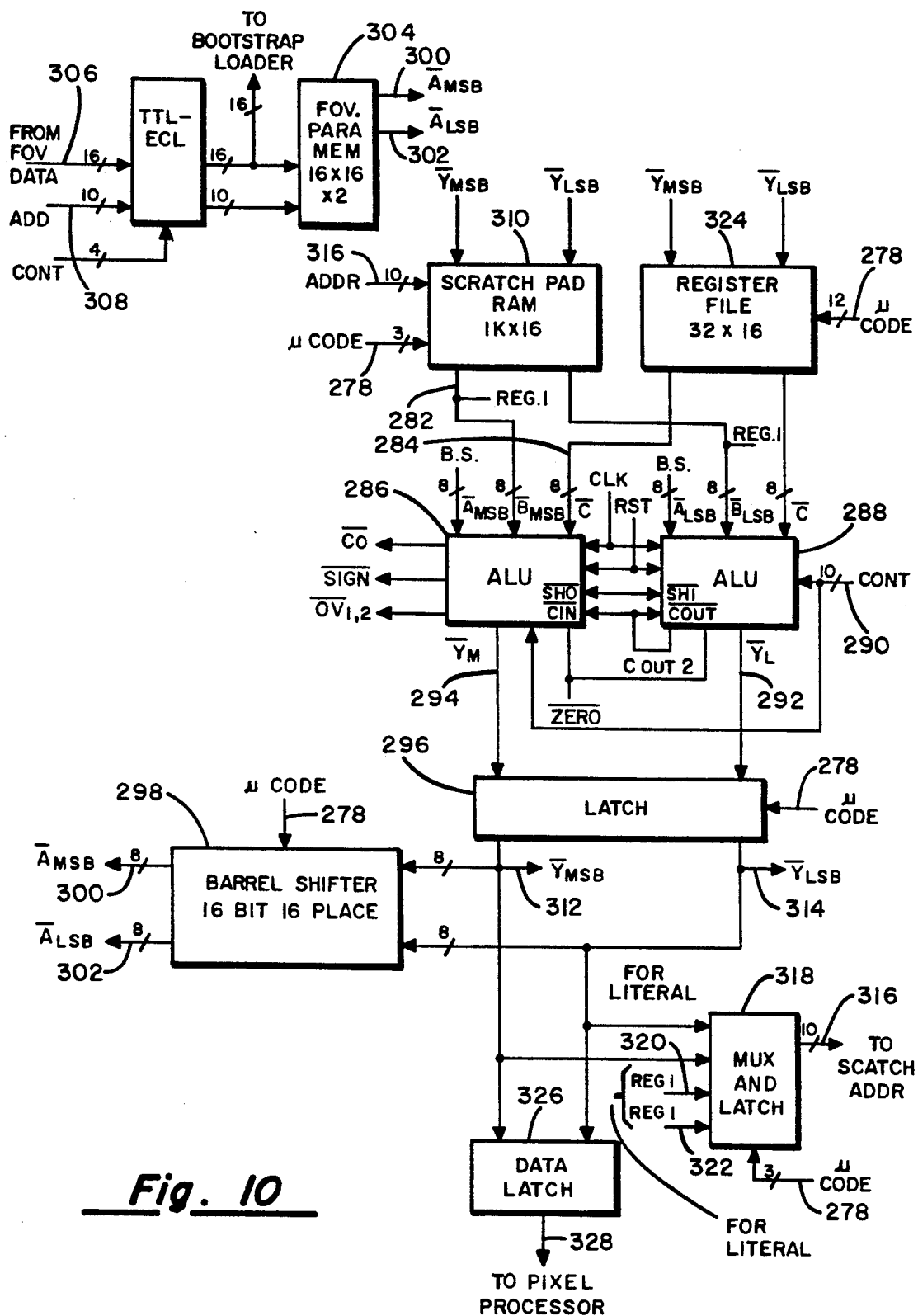
FIGS. 10 and 11 are more detailed logical block diagrams of the field line processor of FIG. 9.
Figure 11:
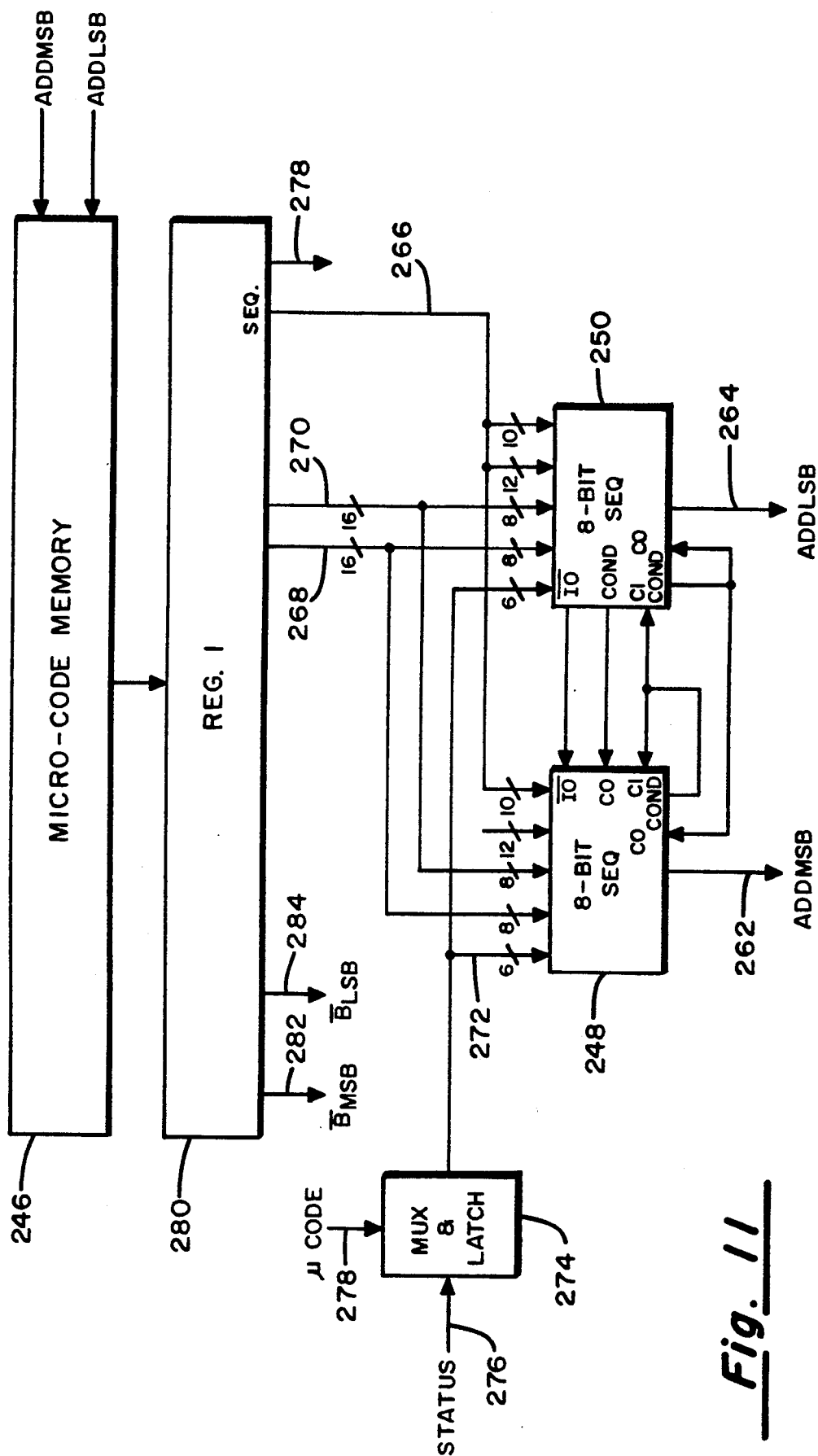

FIGS. 10 and 11 show a detailed block diagram of the field/line processor 220 of FIG. 9. This is preferably a high-speed emitter couple logic (ECL) microprogrammable controller. The stored program is contained in microcode memory 246, a 1K word by 88-bit memory. Two 8-bit address sequencers 248 and 250 are cascaded together to provide the microcode instruction address to control program flow. For each instruction cycle, the 16-bit sequencer generates the most significant byte of the instruction address on address bus 262 while the least significant byte of the address is generated on address bus 264. The address sequencers contain an address counter for the current address. In the event of no program branch, the address generated is simply the current address plus one. Branching is determined by sequencer control lines 266 while lines 268 and 270 each contain a 16-bit branch target to be used as an address alternative to the next sequential address. Branching may be unconditional or conditional. For instructions involving conditional branching, the decision to branch is based on the state of condition code 272 provided by multiplexor/latch 274 which interprets certain status bits on status lines 276 as directed by certain of the microcode bits on lines 278. At the beginning of each micro instruction cycle, the next instruction is fetched from micro-code memory 246 and latched into register 280. The various fields from this 88-bit register control the operation of the processor. Lines 282 and 284 provide the most significant byte and least significant byte, respectively, to define a 16-bit literal field. Microcode bits on lines 278 are a bit field which provides explicit control for various sections of the processor. Central to the processor are the 8-bit arithmetic logic units 286 and 288 (FIG. 10) which are cascaded to form a single 16-bit arithmetic logic unit. The ALUs are directed, via control lines 290, to perform various arithmetic operations on the inputs A, B and C to generate an arithmetic result on output lines 292 and 294 leading to latch 296. An arithmetic operation may result in various status conditions, such as a carryout, a sign bit set, a zero condition or overflow. These status conditions are provided to multiplexor latch 274 (FIG. 11) to generate the branch condition code. The results of each arithmetic operation are captured in latch 296 for use in subsequent arithmetic operations.

Each of the A, B and C inputs of the ALUs have multiple sources of data. The source used is determined by microcode bits on lines 278. One source of A inputs is the output of barrel shifter 298 which provides the most significant byte of A on lines 300 and the least significant byte of input A on lines 302. Barrel shifter 298 performs an N-place shift on the results of a previous arithmetic operation where N is determined by certain of microcode bits on lines 278.

Another source of A input data is the field-of-view parameter memory 304. Warp parameters for each object in the multiple object memory are provided by the FOV computer 10, via memory data lines 306 and memory address on lines 308. Each time the FOV computer 10 brings a new object into the MOM, it also provides the warp parameters to memory 304. Further, each time the field-of-view changes relative to an object, these parameters are again updated. One data source for B inputs to the ALU is the scratch pad RAM memory 310. This is a 1-K word, 16-bit memory used to store intermediate results of calculations. Write data is provided by the outputs of latch 296 on lines 312 and 314. The address on the 10 address lines 316 is provided by multiplexer latch 318. Certain bits of microcode field on lines 278 determine the data source for the scratch pad RAM address. One source is the microword itself using microcode fields on lines 320 and 322. Another source is the output of latch 296 on lines 312 and 314 which provides the capability for a computed scratch pad address. Another source for the input data is microcode register 280 (FIG. 11) which provides a literal field on lines 282 and 284. One source of C input data is the 32 word by 16-bit register file 324. Write data is provided by latch 296 via data lines 312 and 314. The register file address is determined by certain of microcode bits on lines 278. Another source of C input data is the literal field of register 280, via lines 282 and 284.

The function of the field/line processor 220 (FIG. 9) is to compute the unique warp parameters for each line of each object as it is sent through the pipeline processor. The warp parameters are scaled and offset and since they may be unique for each line and each object, they must be recalculated at a maximum cell rate, i.e., every 6.5 microseconds. That is to say, there are a maximum of 12 cells per line and 1024 lines. Therefore, each field/line processor must calculate new line parameters six times per line.

For each line to be processed, field line processor 220 generates the new values of line scale and offset based upon the object identity, the object line number and the object field-of-view parameters from memory 304. The results of this calculation are captured in data latch 326 and communicated to the pixel processor via data lines 328 (FIG. 10).

MEMORY MAPPER/MULTIPURPOSE MEMORY INTERFACE

Figure 12:
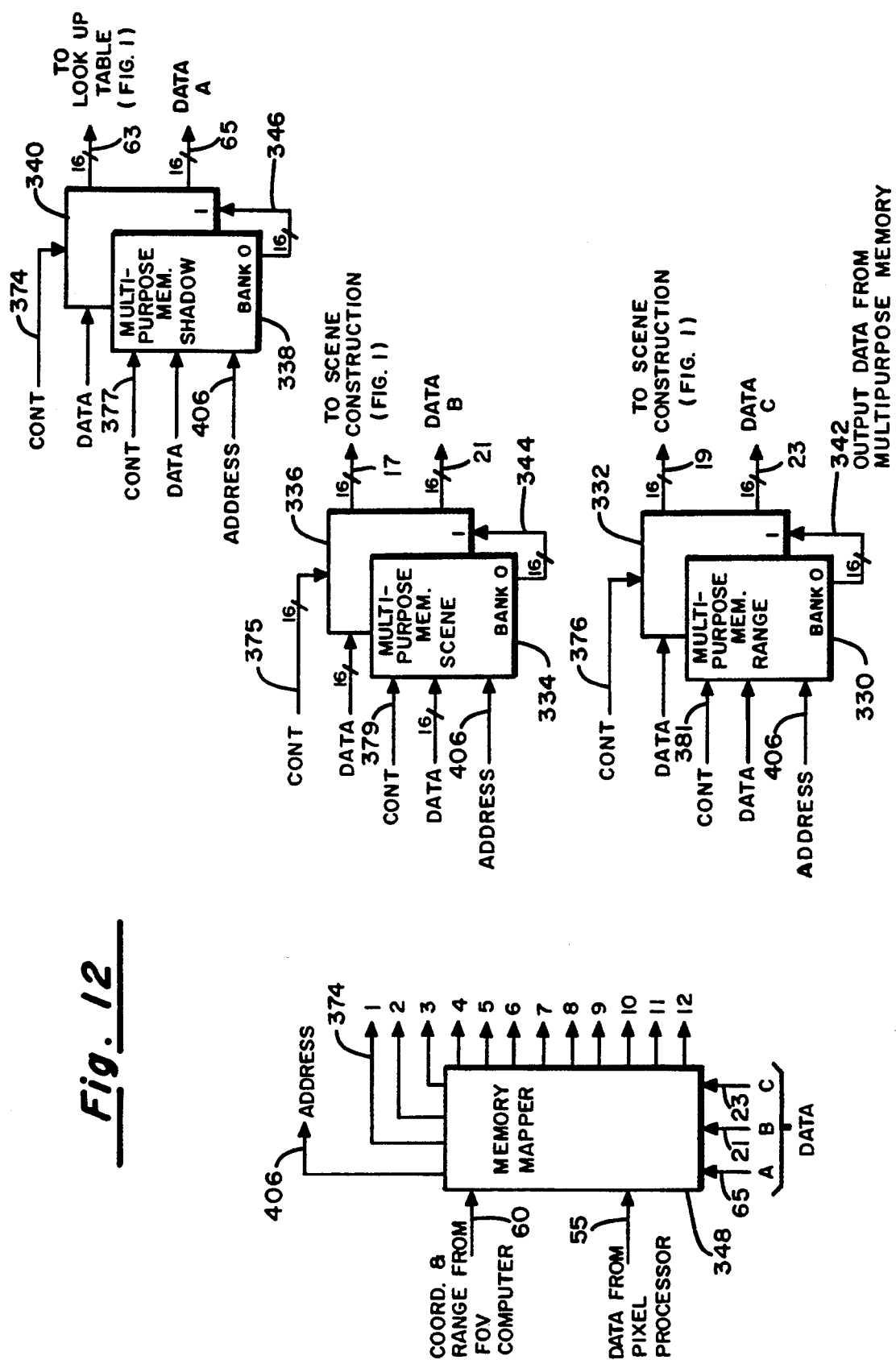
FIG. 12 is a detailed block diagram of the memory mapper circuitry of FIG. 1.

FIG. 12 shows the arrangement between the memory mapper and the various multipurpose memories which comprise the shadow, scene, and range portions of the image. Each of the memory banks 330 through 340 is 1024 by 1024 by 8. Each byte of each memory corresponds to one pixel in the 1024 by 1024 scene, i.e., for each pixel in the scene there is an 8-bit value specifying the range of the pixel to be displayed, an 8-bit value representing the code of the scene value to be displayed and an 8-bit value representing the shadow information accompanying that pixel. While the memory mapper is creating a new scene in the bank 0 memories, the display is generated by reading contents of the bank 1 memories. When the bank 0 scene has been completed, the assignments of banks are reversed such that the displays generated by bank 0 while the memory mapper builds the next scene in bank 1. This is the aforementioned double buffering of the scene memories which makes the scene building process invisible to the observer, providing a smooth continuous completely filled scene at every instant. Data paths 342 through 346 provide communication of data from the bank 0 to the bank 1 memories where it is multiplexed to provide either data to the scene construction process or outputs for 19, 17 or the lookup table outputs 63 or alternatively, to provide data feedback to the memory mapper inputs via lines 21, 23 and 65.

Object data in video form is provided to the memory mapper 348 (58 in FIG. 1) from the MOPL pixel processor on data line 55 (FIG. 1). The field-of-view computer 10 communicates the coordinates of the X/Y origin allowing cell translation within the memories and the range of each object to be processed by the memory mapper. For each input pixel, the memory mapper reads the contents of the target address of both the scene memory and the range memory. This data is brought back to the memory mapper on lines 21 and 23, respectively, and as was previously described, this information is used to determine whether the new pixel should occlude the scene thus far generated and, thus, overwrite the current contents of that pixel within the scene memory. Whenever a new pixel is written into the scene memory, the object range provided by the FOV computer 10 is written in the corresponding pixel of the range memory. If the object to be written is a shadow rather than a scene, the pixel data is directed to the shadow memory 340 in the same fashion as scene data.

Figure 13:
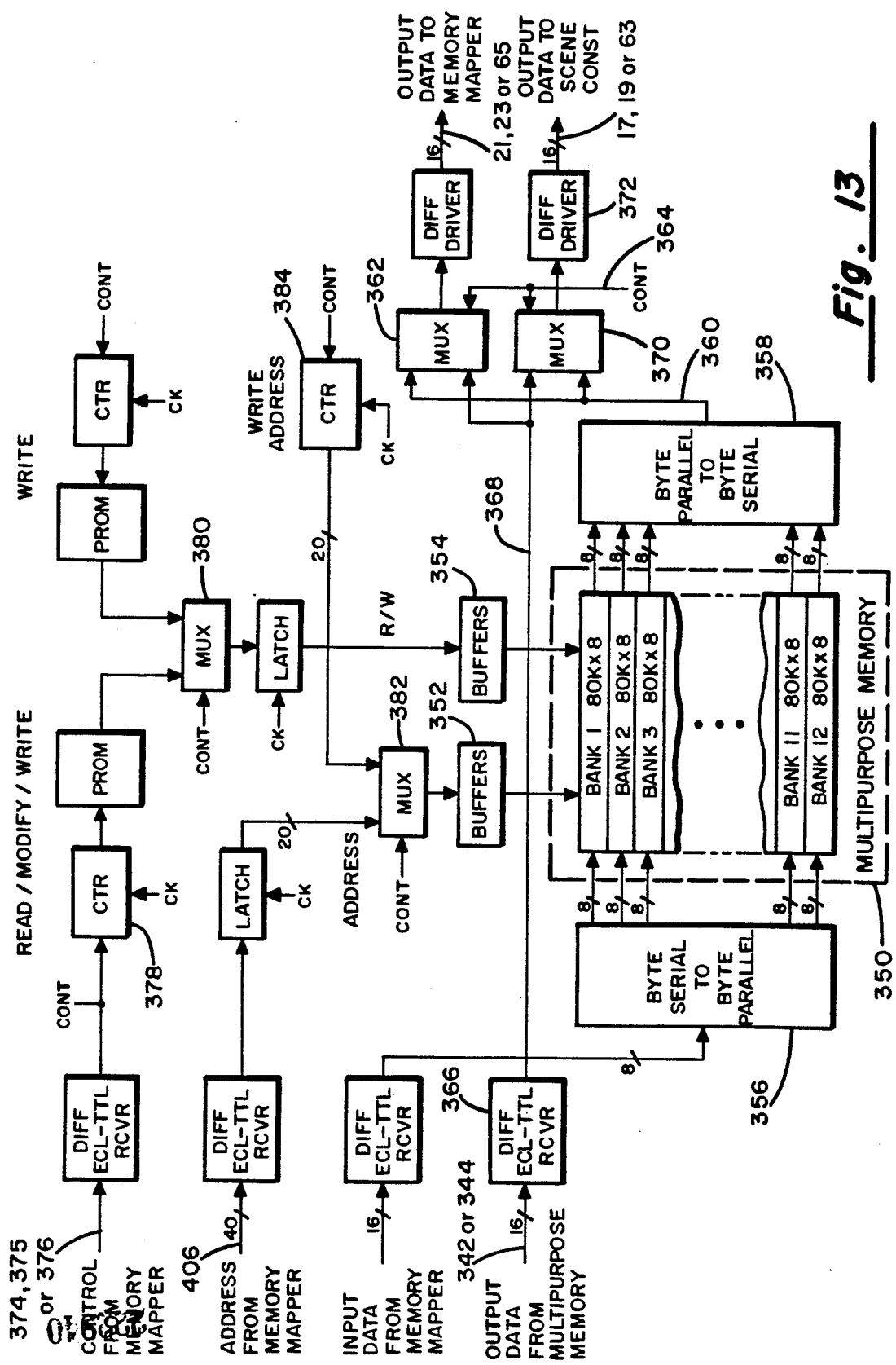
FIG. 13 is a detailed block diagram of the multipurpose memory used in FIG. 12.

FIG. 13 shows a detailed block diagram of the bank 1 or bank 0 type of multipurpose memory. Memory array 350 is comprised of 12 identical banks of semiconductor RAM memory, each bank having a capacity 81,920 bytes. Since each line in a scene requires 1024 bytes or pixels, each bank has a capacity for 80 lines and the 12 banks provide the capacity for the 960 lines which comprise a complete scene. The data is interleaved among banks such that pixels 1, 13, 25, etc., are all stored in bank 1 and consecutive pixels are stored in consecutive banks. All banks share a common set of address lines provided by buffer 352 and a common set of read/write control lines provided by buffers 354. During a write operation, twelve consecutive bytes are assembled in the byte serial to byte parallel converter 356 at 60 MHz rate. Every 200 nanoseconds, all twelve bytes are concurrently written into their respective banks of memory array 350. Similarily, a single read cycle produces twelve bytes to the input of byte parallel to byte serial converter 358. These bytes are presented sequentially at a 60 MHz rate on data bus 360. This bank interleave arrangement allows a 60 MHz video rate to be maintained with a read/modify write cycle on the same memory. Data is read/modified (if applicable) and written in one bank at a 60 MHz rate, with data from the MOPL processor. The output bank produces a 40 MHz video stream to scene construction module 20 (FIG. 1).

Multiplexer 362 determines the source of memory data to be sent to the memory mapper. If control line 364 is a 0, the source of data is the respective bank 0 memory arrays 330 or 334 (FIG. 12). This is communicated via lines 342 or 344 through differential receiver 366 in lines 368. When bank 0 data is going to the memory mapper, bank 1 data line 360 propagates through multiplexer 370 and is sent via differential driver 372 to scene construction via lines 17 or 19. When control line 364 is set, the alternative inputs of multiplexer 362 and 370 are selected such that bank 0 data is routed to scene construction and bank 1 data is routed to the memory mapper. Control signals from the memory mapper are communicated via lines 374, 375 or 376. These control signals provide a number of explicit control functions for the multipurpose memory, namely:

1. The control of the state of multiplexers 362 and 370.
2. The control of the preset of counter 378.
3. The control of the selection of multiplexer 380.
4. The control of the selection of multiplexer 382.
5. The control of the preset of write address counter 384.

Figure 14:
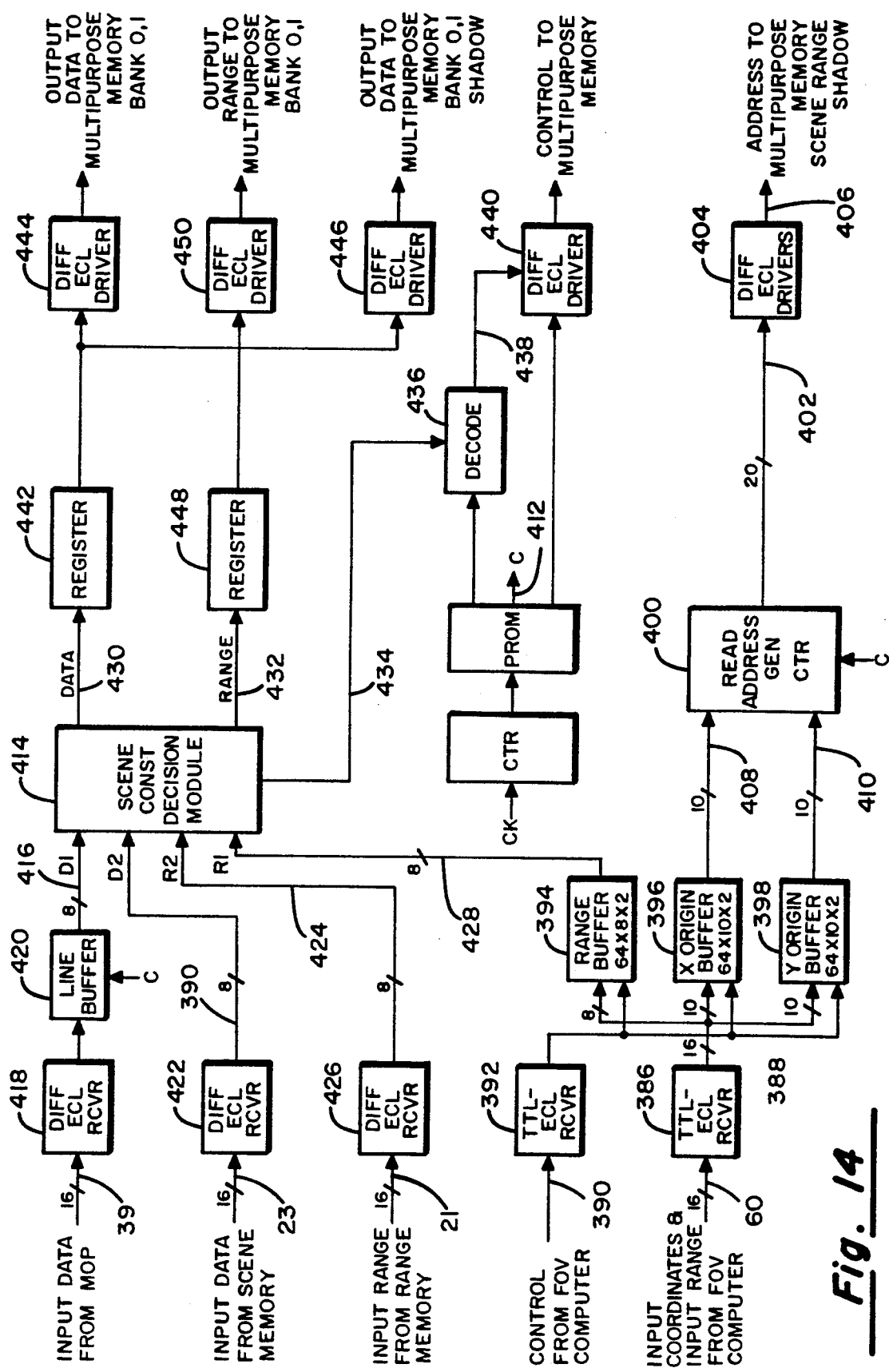
FIG. 14 is a detailed logic diagram of the memory mapper circuitry for the multipurpose memory.

FIG. 14 shows a detailed block diagram of the memory mapper. For each instance of an object appearing in the scene to be constructed, the FOV computer 10 transmits the X and Y origin and the range associated with this instance, via lines 60 (FIG. 1) to buffer receiver 386. The coordinate data and range data is multiplexed on 16-bit lines 388. Control information from the field-of-view computer is communicated via lines 390 and buffer receiver 392 to direct the data on lines 388 to the correct buffer, i.e., range buffer 394, X origin buffer 396 or Y origin buffer 398. Each buffer is a double buffer to enable simultaneous loading and reading of each buffer. Each rank of each buffer contains a capacity for 64 objects or object instances since a single object may appear multiple times.

Read address counter 400 generates the destination address for each pixel arriving from the MOPL. It is comprised of two 10-bit counters cascaded to form a 20-bit address on lines 402 which is communicated to the multipurpose memories via driver 404 in line 406. At the beginning of an object, buffers 396 and 398 provide presets to both address counters, via lines 408 and 410. The Y axis counter is incremented 127 times by control signals on line 408. Referring to the following example, frame line 0, the first line of data, is placed in its correct y location by presetting the y counter, then incrementing it by 127 on a per-cell basis. The x does not increment until the next frame line where this cell is located is output.

As output from pixel processor

First Line 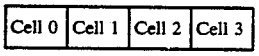

Second Line 

... 128th 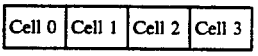

Cell 0 is to be placed @ 0,0
Cell 1 is to be placed @ 317,245
Cell 2 is to be placed @ 900,020

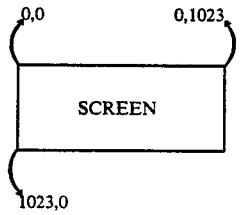

Line 1
Cell 0
{ Load '396' w 0
  Load '398' w 0
  Increment '398" 127 times

Cell 1
{ Load '396' w 317
  Load '398' w 245
  Increment '398' 127 times

Cell 2
{ Load '396' w 900
  Load '398' w 20
  Increment '398' 127 times

.
.

Line 2:
Load '396' w 0 and increment once
Load '398' w 0
Increment '398' 127 times
Load '396' w 317 and increment once
Load '398' w 245
Increment '398' 127 times and so on.

The scene construction decision module 414 receives four sources of data in synchronism for each input pixel. The data D1 on line 416 is the new pixel data from MOPL processor, lines 39 via differential receiver 418 and line buffer 420. The function of the buffer 420 is to maintain synchronization between D1 and D2. However, Data D2 on line 390 is provided from the active bank of the scene memory, via lines 23 (FIG. 1) and differential receiver 422. This is data from the scene memory at the address specified by address generator 400. From the corresponding address of the active bank of the range memory, the value R2 on line 424 is provided via lines 21 and differential receiver 426. The range of the new object, R1, line 428, is provided from range buffer 394. The decision logic performed by the scene construction decision module 414 is shown in the Truth Table (Table I) below.

TABLE I

| TRUTH TABLE | | | | |
|---|---|---|---|---|
| R1 > R2 | R2 > R1 | D1 | D2 | RESULT |
| 0 | 0 | 0 | 0 | D1 |
| 0 | 0 | 0 | 1 | D2 |
| 0 | 0 | 1 | 0 | D1 |
| 0 | 0 | 1 | 1 | D1 |
| 0 | 1 | 0 | 0 | D1 |
| 0 | 1 | 0 | 1 | D2 |
| 0 | 1 | 1 | 0 | D1 |
| 0 | 1 | 1 | 1 | D1 |
| 1 | 0 | 0 | 0 | D1 |
| 1 | 0 | 0 | 1 | D2 |
| 1 | 0 | 1 | 0 | D1 |
| 1 | 0 | 1 | 1 | D2 |
| 1 | 1 | 0 | 0 | THESE STATES |
| 1 | 1 | 0 | 1 | CAN ONLY |
| 1 | 1 | 1 | 0 | OCCUR BY |
| 1 | 1 | 1 | 1 | HARDWARE FAILURE |

1 = VALUE TRUE/OCCUPIED
0 = NOT OCCUPIED OR NOT TRUE

Thus, the scene construction decision module functions to accept video and range data from the several sources identified along the left edge of FIG. 14 and combines these videos on a pixel-by-pixel basis in real-time to form the composite scene. This scene will then include the background as well as one or more targets. These videos are combined on the basis of their ranges which are quantized into range bins by an algorithm referred to as a "nearest occupied" algorithm. Basically, this means that the range bins of all input signals are compared to find the nearest one to the display. If the nearest is unoccupied, i.e, has a "0" value, then the next nearest is tested for occupancy, with the process being repeated. This process is actually performed on all inputs in parallel at each pixel time slot through the use of a tree of two input decision modules. Each decision module is followed by smoothing logic which performs a weighted summing of background and foreground pixels whenever the decision module switches. This smoothing action is necessary to prevent aliasing in the scene near the edges of each object. The resulting data on lines 430 is thus either D1 or D2. Per the above table and the resulting D1 associated value of range on lines 432 flow through, when the associated D1 range is less than (selected), it then flows through. The selection of D1 causes control signals to be generated on lines 374 or 377 or 375, 379 or 376, or 381 (FIG. 12) to cause the new value to be overwritten in the appropriate multipurpose memory module. This all happens via lines 434, decode 436, on lines 438 and driver 440.

Data is captured in register 442 and directed to the scene memory multipurpose memory via driver 444 if the object is, in fact, an object. If the object is a shadow, the data is directed to the shadow multipurpose memory via differential driver 446. Similarly, range is captured in register 448 and is directed to the range memory via differential driver 450.

Figures 1, 15A:
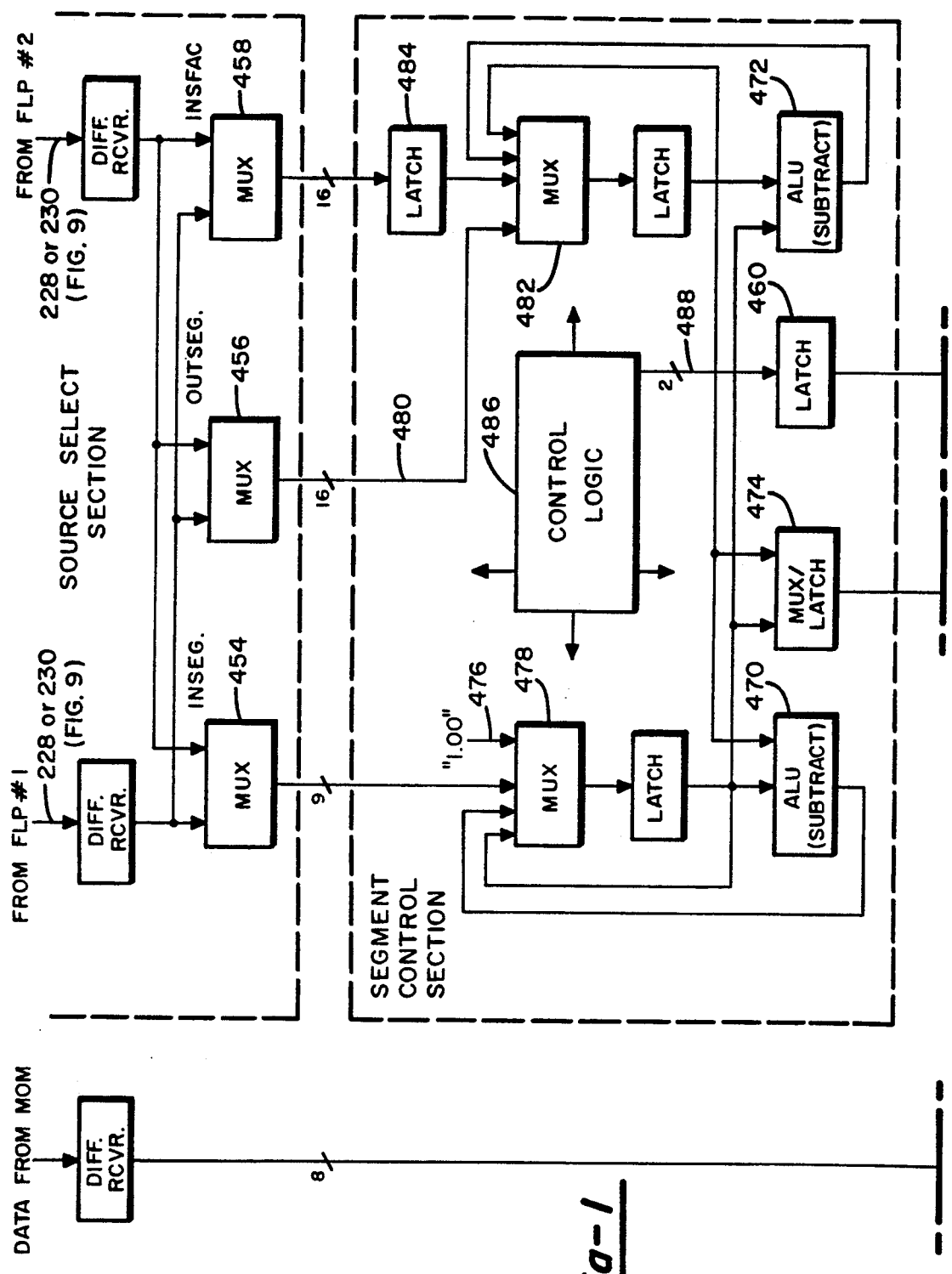
FIGS. 15a and 15b together comprise a block diagram of the pixel processor.
Figures 2, 15A:
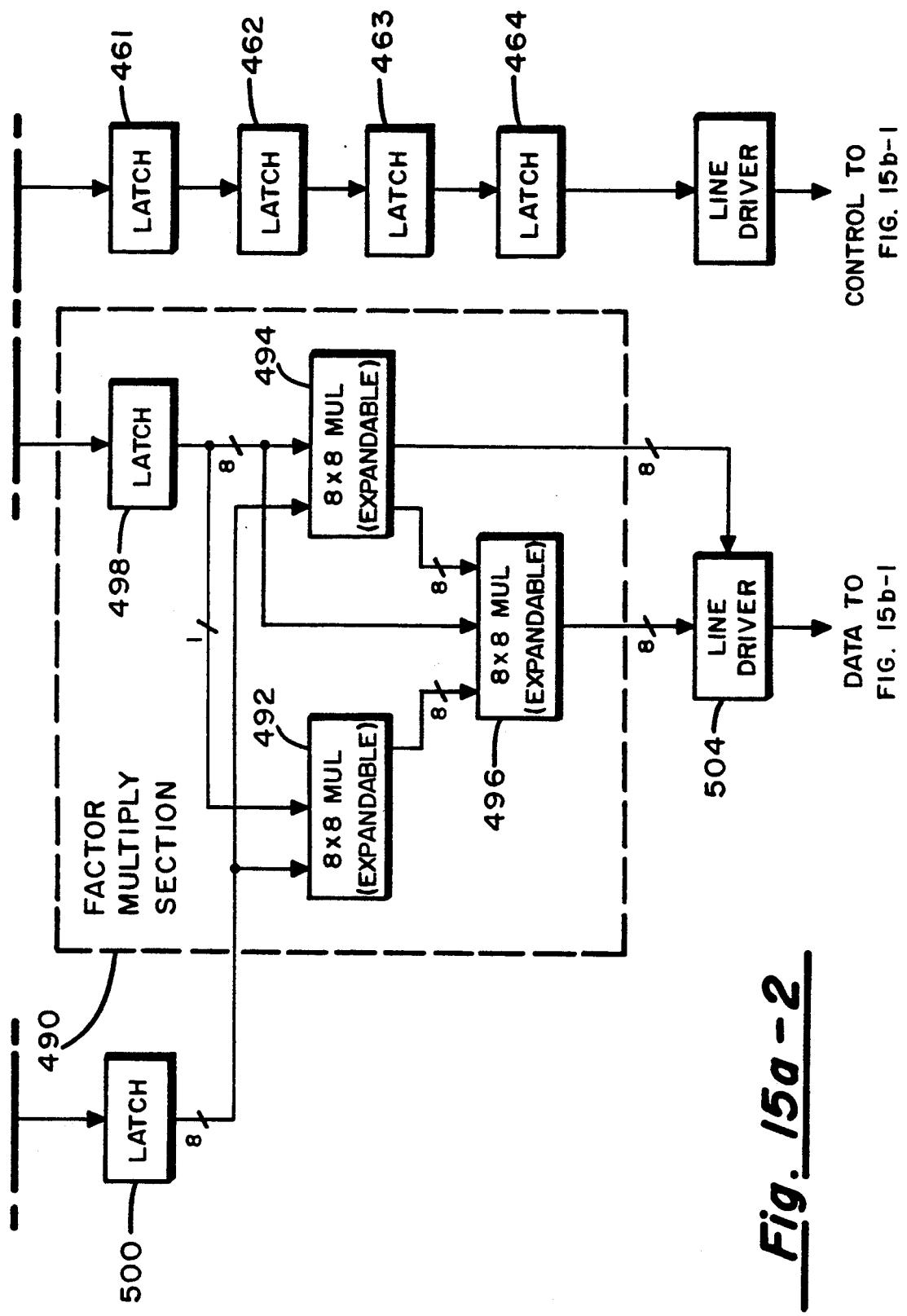
Figures 2, 15B:
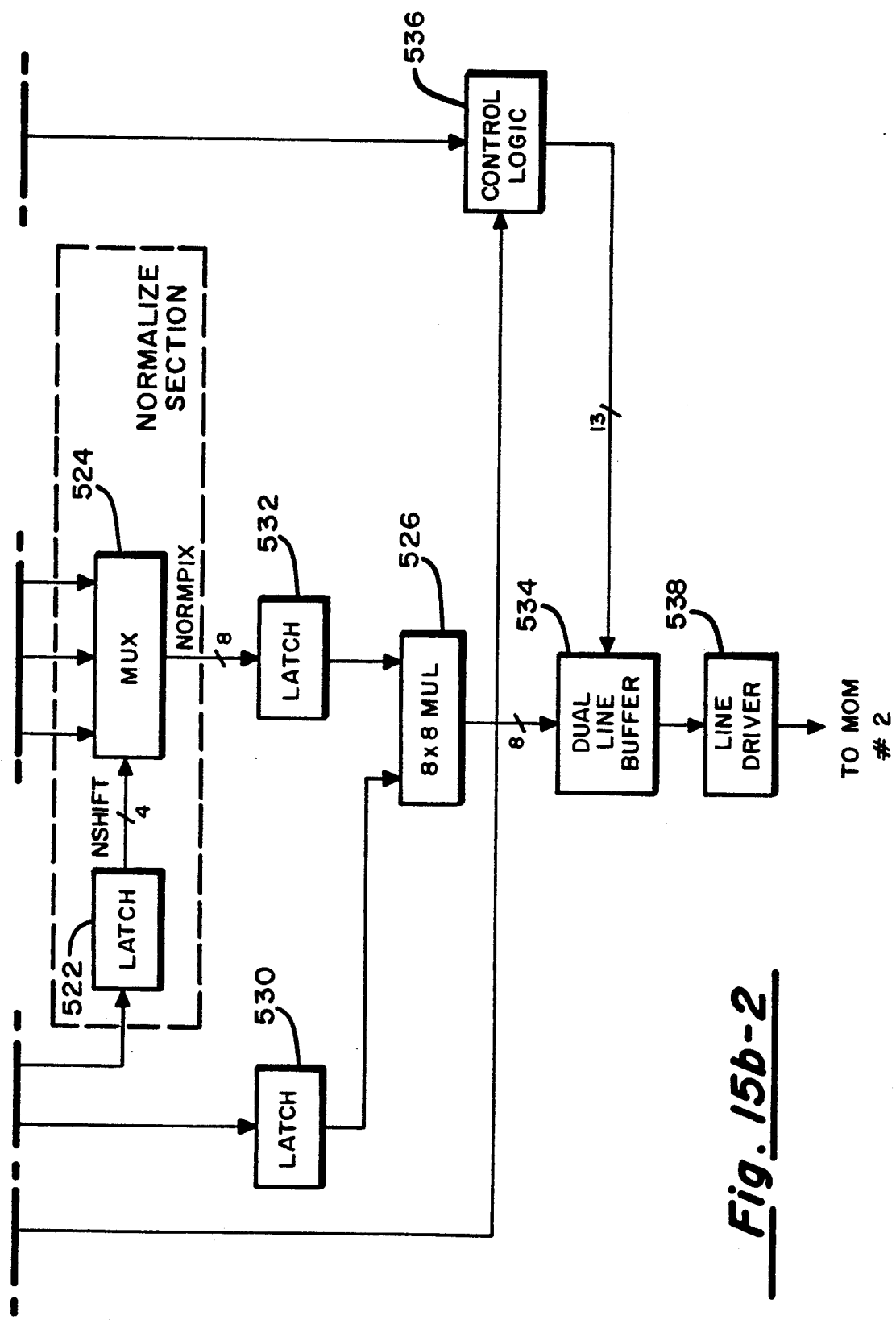

FIGS. 15a and 15b provide a more detailed block diagram of pixel processors 224 and 226 of FIG. 9.

The definition of terms employed is this description is as follows:

CELL CLOCK—12.5 nanosecond clock that is synchronous with the 25 nanosecond clock. Cell clock rises at center of pixel boundary.

EVEN CELL—First half of Pixel Clock Cycle.

INSFAC—The reciprocal of SIZFAC. The ratio of input line length to output line length. The ratio of input pixels consumed to the number of output pixels generated.

INSEG—The portion of an Input Pixel remaining. INSEG may vary between 1.00 and 1/256.

ODD CELL—Second half of Pixel Clock Cycle.

OUTSEG—The portion of Input Pixels required to complete an output pixel. OUTSEG may vary from 255 to 1/256.

PIXEL CLOCK—25 nanosecond clock that is in synchronism with the pixels 40 MHz Square Wave Clock rises on pixel boundary.

PIXEL VALUE—An intensity value for a pixel. (0 to 255, 8-bit binary) 0 being low intensity (black), 255 being high intensity (white).

SIZFAC—The ratio of the number of output pixels generated to number of input pixels consumed. The ratio of output line length to input line length. The reciprocal of INSFAC.

The Field/Line Processor 220 through 223 provides the initial INSEG and OUTSEG data along with line buffer address and control plus INSFAC, normalized SIZFAC, and NSHIFT values.

Pixel Processing Control is derived by comparing the values of INSEG and OUTSEG. If OUTSEG is smaller than INSEG, it means that there is sufficient input pixel available to complete an output pixel. If INSEG is smaller than OUTSEG, it means that there is not sufficient input pixel left to complete the output pixel and the current input pixel will be used up and a new pixel must be fetched. There are only these two conditions in which an output pixel will be completed without using up an input pixel or an input pixel will be used without finishing an output pixel.

If an output pixel is to be completed, the current pixel value is multiplied by OUTSEG and added to the accumulator. INSEG is decremented by the value of OUTSEG to indicate usage of that portion of the input pixel. OUTSEG is then initialized to INSFAC indicating that a complete output pixel remains to be satisfied. The contents of the accumulator are scaled by SIZFAC and the result is the value of the next output pixel. The process then returns to compare the new values of INSEG and OUTSEG.

If an input pixel is to be used up, the current pixel value is multiplied by INSEG and added to the accumulator. OUTSEG is decremented by the value of INSEG to indicate that a portion of the output pixel has been satisfied. INSEG is then reinitialized to 1.0 and the next input pixel is fetched. The process then returns to compare the new values of INSEG and OUTSEG.

The heart of the process is the interplay between INSEG and OUTSEG scaling input pixels to output pixels. The effect is of pixel scaling and migration from one discrete grid to another discrete grid through a continuous interpolation process. The success of this continuous scaling process depends on the fractional precision of INSEG and OUTSEG. With sufficient precision, the effect is of perfectly smooth pixel migration between the two discrete grids.

Subpixel phasing is accomplished by initializing OUTSEG to some percentage of INSFAC to create a partial first output pixel. The last output pixel may not be completed at the time the input pixels are exhausted, resulting in a partial last output pixel. This allows continuous positioning of the output with relationship to the discrete pixel grid and eliminates edge aliasing.

The input pixel values described above do not necessarily correspond directly with Buffer Memory pixel values. Buffer Memory input pixels are averaged from a continuously interpolated one pixel wide window to provide smoothing during line expansion. The window placement is determined by the value of INSEG.

HARDWARE DESCRIPTION

A. Segment Control Block

The Pixel Processor Segment Control block shown enclosed in broken line box 452 (FIG. 15a-1) is responsible for generating the factor which will determine how much of the input pixel will be used to generate the next output pixel. The Segment Control Block also generates control signals to request another input pixel, generate an output pixel and indicate which data is valid to the subsequent stage of the pipeline.

The parameters INSEG, OUTSEG and INSFAC used by the Segment Control block are loaded from the line processors once per line during the previous active line via bus 228/230 (FIG. 9) to multiplexors 454, 456 and 458, respectively. Calculations are performed at a 12.5 nsec. rate and outputs are generated at the same rate but are pipelined by latches 460 through 464 and 465 through 468 so as to make the outputs available to the stages that use them at the correct time.

The computations performed are as follows. The amount of the input pixel remaining (INSEG) is compared with the amount of output pixel still to be created (OUTSEG) by ALUs 470 and 472. The smaller of these two quantities is selected by multiplexor/latch 474 to become the output FACTOR which will specify how much of the input pixel is to be used in creating the current output pixel.

If the computation is occurring in the first half of the pixel time (even cell), a decision is made about whether or not the current input pixel has been "used up" and a new one needs to be requested from the memory. This determination is made by comparing INSEG and OUTSEG. If INSEG is less than OUTSEG, then all of the remaining input pixel will be used in creating the current output pixel and a new input pixel is requested. INSEG is then initialized to the value of one by selecting input 476 for multiplexor 478 signifying that a whole input pixel will be available. If INSEG is greater than OUTSEG, then no action is taken.

If the computation is occurring during the second 12.5 nsec. of the pixel time (odd cell), a decision is made about whether or not the current output pixel is finished and a new output pixel is to be started. In this case, if OUTSEG is less than INSEG, the current factor, which is OUTSEG, will be used in creating the current output pixel by selecting input 480 for multiplexor 482. The generation of a new pixel will be initiated during the next cell time. OUTSEG is then initialized to INSFAC for the next cell time calculation by selecting the pipelined value of INSFAC from latch 484 for multiplexor 482. If OUTSEG is greater than INSFAC, no action is taken.

Control logic 486 generates the control signals to generate a unique OUTPUT FACTOR in synchronism with each byte of pipelined data in the manner just described. Also generated are pipeline control signals on line 488 comprised of the signals RUN and Generate Output Pixel, GOP.

B. Output Factor Multiply

The Output Factor Multiply section, shown enclosed by broken line box 490 (FIG. 15a-2), performs a multiply of input pixels times the output factor values. Eight by eight multipliers 492, 494 and 496 are combined to form a 9×8 multiplier such that the product of the 9-bit output factor from latch 498 and the 8-bit pipeline data from latch 500 are combined to form a 16-bit product. This FACTPIX term is communicated to the 24-bit accumulator section 502 via line driver 504 and differential receiver 506. Pixel building is accomplished by the 24-bit accumulator section 502 (FIG. 15b-1). This is a three-stage pipelined 24-bit recirculating adder comprised of arithmetic logic units 508, 510 and 512 where each of these ALU's are further comprised of a pair of 4-bit arithmetic logic units. The accumulator must be able to accept data every 25 nanoseconds. This is accomplished in three stages to minimize the carry propagation delay across each stage and thus maintain the required high throughput. The pipelined arrangement allows a 24-bit term to be accumulated in latches 514, 516 and 518. The term, ACCUM, is the summation of the term FACTPIX over a specified period of time. The field line processors provide the pipelined term NSHIFT via multiplexor latch 520 and latch 522. The term NSHIFT determines the alignment of the 8-bit output of multiplexor 524 (FIG. 15b-2). Eight-by-eight multiplier 526 forms the product of the pipelined term NSIZFAC provided from the field line processors, via mux latch 528 and latch 530 with the pipelined term NORMPIX provided via latch 532. The output of multiplier 526 is the completed pipelined pixel PIXOUT which is captured in dual line buffer 534. Buffer 534 accounts for the disparity in input and output pixel rates inherent in the warp process. Under the control logic 536, pixels are accumulated in buffer 534 as their generation is completed by the pixel processor and are outputted via line driver 538 as required by the next processing element, i.e., multi-purpose memory 236 (FIG. 9) or memory mapper 58 (FIG. 1). Each line buffer is a 1536 byte memory addressed by an 11-bit presettable counter. To write a line of PIXOUT data into buffer 534, control logic 536 first provides a starting address on the basis of data provided by the field line processor. The counter is then incremented as successive values of PIXOUT are loaded into the buffer. Buffer 534 is unloaded in a similar manner.

The operation of the accumulator is based on selectively recirculating the register data into the ALU A port and permitting new data to enter via the D port. The ALU is controlled by control logic 536 in response to the pipelined control signals, RUN, GOP (Generate Output Pixel) and VALID. Whenever RUN is inactive, the output of the ALU is forced to zero. This insures that there is no residual count in the accumulator register before pixel building begins. When RUN is active, the accumulator is enabled to perform the following operations: Whenever VALID is active, the ALU adds FACTPIX to the contents of the accumulator except for the first VALID after a GOP. In this case, GOP signals the end of the accumulation, and the next valid data coming down the pipeline will be the beginning of a new output pixel. This has the effect of clearing and restarting the accumulator with new data. GOP may occur without VALID being active when the Input frame Buffer runs out of Input Pixels and there is an uncompleted Output Pixel in the accumulator.

| CALCULATING NSHIFT | | | | | | | | | |
|---|---|---|---|---|---|---|---|---|---|
| SIZFAC NISB | | NORMALIZED SIZEFAC | | | | | | | |
| $2^{-8}$ ($\times 2^{15}$) | $2^{-8}$ | 0 | 0 | 0 | 0 | 0 | 0 | 0 | 0 |
| $2^{-7}$ ($\times 2^{14}$) | $2^{-7}$ | $2^{-8}$ | 0 | 0 | 0 | 0 | 0 | 0 | 0 |
| $2^{-6}$ ($\times 2^{13}$) | $2^{-6}$ | $2^{-7}$ | $2^{-8}$ | 0 | 0 | 0 | 0 | 0 | 0 |
| $2^{-5}$ ($\times 2^{12}$) | $2^{-5}$ | $2^{-6}$ | $2^{-7}$ | $2^{-8}$ | 0 | 0 | 0 | 0 | 0 |
| $2^{-4}$ ($\times 2^{11}$) | $2^{-4}$ | $2^{-5}$ | $2^{-6}$ | $2^{-7}$ | $2^{-8}$ | 0 | 0 | 0 | 0 |
| $2^{-3}$ ($\times 2^{10}$) | $2^{-3}$ | $2^{-4}$ | $2^{-5}$ | $2^{-6}$ | $2^{-7}$ | $2^{-8}$ | 0 | 0 | 0 |
| $2^{-2}$ ($\times 2^{9}$) | $2^{-2}$ | $2^{-3}$ | $2^{-4}$ | $2^{-5}$ | $2^{-6}$ | $2^{-7}$ | $2^{-8}$ | 0 | 0 |
| $2^{-1}$ ($\times 2^{8}$) | $2^{-1}$ | $2^{-2}$ | $2^{-3}$ | $2^{-4}$ | $2^{-5}$ | $2^{-6}$ | $2^{-7}$ | $2^{-8}$ | |
| $2^{0}$ ($\times 2^{7}$) | $2^{0}$ | $2^{-1}$ | $2^{-2}$ | $2^{-3}$ | $2^{-4}$ | $2^{-5}$ | $2^{-6}$ | $2^{-7}$ | |
| $2^{1}$ ($\times 2^{6}$) | $2^{1}$ | $2^{0}$ | $2^{-1}$ | $2^{-2}$ | $2^{-3}$ | $2^{-4}$ | $2^{-5}$ | $2^{-6}$ | |
| $2^{2}$ ($\times 2^{5}$) | $2^{2}$ | $2^{1}$ | $2^{0}$ | $2^{-1}$ | $2^{-2}$ | $2^{-3}$ | $2^{-4}$ | $2^{-5}$ | |
| $2^{3}$ ($\times 2^{4}$) | $2^{3}$ | $2^{2}$ | $2^{1}$ | $2^{0}$ | $2^{-1}$ | $2^{-2}$ | $2^{-3}$ | $2^{-4}$ | |
| $2^{4}$ ($\times 2^{3}$) | $2^{4}$ | $2^{3}$ | $2^{2}$ | $2^{1}$ | $2^{0}$ | $2^{-1}$ | $2^{-2}$ | $2^{-3}$ | |
| $2^{5}$ ($\times 2^{2}$) | $2^{5}$ | $2^{4}$ | $2^{3}$ | $2^{2}$ | $2^{1}$ | $2^{0}$ | $2^{-1}$ | $2^{-2}$ | |
| $2^{6}$ ($\times 2^{1}$) | $2^{6}$ | $2^{5}$ | $2^{4}$ | $2^{3}$ | $2^{2}$ | $2^{1}$ | $2^{0}$ | $2^{-1}$ | |
| $2^{7}$ ($\times 2^{0}$) | $2^{7}$ | $2^{6}$ | $2^{5}$ | $2^{4}$ | $2^{3}$ | $2^{2}$ | $2^{1}$ | $2^{0}$ | |

| SIZFAC NISB | | NORMALIZED ACCUMULATOR | | | | | | | | SHIFT MUX | | | |
|---|---|---|---|---|---|---|---|---|---|---|---|---|---|
| | | | | | | | | | | $S_3$ | $S_4$ | $S_1$ | $S_0$ |
| $2^{-8}$ ($\times 2^{15}$) | $2^F$ | $2^E$ | $2^D$ | $2^C$ | $2^B$ | $2^A$ | $2^9$ | $2^8$ | ($\times 2^{-15}$) | 1 | 1 | 1 | 1 |
| $2^{-7}$ ($\times 2^{14}$) | $2^E$ | $2^D$ | $2^C$ | $2^B$ | $2^A$ | $2^9$ | $2^8$ | $2^7$ | ($\times 2^{-14}$) | 1 | 1 | 1 | 0 |
| $2^{-6}$ ($\times 2^{13}$) | $2^D$ | $2^C$ | $2^B$ | $2^A$ | $2^9$ | $2^8$ | $2^7$ | $2^6$ | ($\times 2^{-13}$) | 1 | 1 | 0 | 1 |
| $2^{-5}$ ($\times 2^{12}$) | $2^C$ | $2^B$ | $2^A$ | $2^9$ | $2^8$ | $2^7$ | $2^6$ | $2^5$ | ($\times 2^{-12}$) | 1 | 1 | 0 | 0 |
| $2^{-4}$ ($\times 2^{11}$) | $2^B$ | $2^A$ | $2^9$ | $2^8$ | $2^7$ | $2^6$ | $2^5$ | $2^4$ | ($\times 2^{-11}$) | 1 | 0 | 1 | 1 |
| $2^{-3}$ ($\times 2^{10}$) | $2^A$ | $2^9$ | $2^8$ | $2^7$ | $2^6$ | $2^5$ | $2^4$ | $2^3$ | ($\times 2^{-10}$) | 1 | 0 | 1 | 0 |
| $2^{-2}$ ($\times 2^{9}$) | $2^9$ | $2^8$ | $2^7$ | $2^6$ | $2^5$ | $2^4$ | $2^3$ | $2^2$ | ($\times 2^{-9}$) | 1 | 0 | 0 | 1 |
| $2^{-1}$ ($\times 2^{8}$) | $2^8$ | $2^7$ | $2^6$ | $2^5$ | $2^4$ | $2^3$ | $2^2$ | $2^1$ | ($\times 2^{-8}$) | 1 | 0 | 0 | 0 |
| $2^{0}$ ($\times 2^{7}$) | $2^7$ | $2^6$ | $2^5$ | $2^4$ | $2^3$ | $2^2$ | $2^1$ | $2^0$ | ($\times 2^{-7}$) | 0 | 1 | 1 | 1 |
| $2^{1}$ ($\times 2^{6}$) | $2^6$ | $2^5$ | $2^4$ | $2^3$ | $2^2$ | $2^1$ | $2^0$ | $2^{-1}$ | ($\times 2^{-6}$) | 0 | 1 | 1 | 0 |
| $2^{2}$ ($\times 2^{5}$) | $2^5$ | $2^4$ | $2^3$ | $2^2$ | $2^1$ | $2^0$ | $2^{-1}$ | $2^{-2}$ | ($\times 2^{-5}$) | 0 | 1 | 0 | 1 |
| $2^{3}$ ($\times 2^{4}$) | $2^4$ | $2^3$ | $2^2$ | $2^1$ | $2^0$ | $2^{-1}$ | $2^{-2}$ | $2^{-3}$ | ($\times 2^{-4}$) | 0 | 1 | 0 | 0 |
| $2^{4}$ ($\times 2^{3}$) | $2^3$ | $2^2$ | $2^1$ | $2^0$ | $2^{-1}$ | $2^{-2}$ | $2^{-3}$ | $2^{-4}$ | ($\times 2^{-3}$) | 0 | 0 | 1 | 1 |
| $2^{5}$ ($\times 2^{2}$) | $2^2$ | $2^1$ | $2^0$ | $2^{-1}$ | $2^{-2}$ | $2^{-3}$ | $2^{-4}$ | $2^{-5}$ | ($\times 2^{-2}$) | 0 | 0 | 1 | 0 |
| $2^{6}$ ($\times 2^{1}$) | $2^1$ | $2^0$ | $2^{-1}$ | $2^{-2}$ | $2^{-3}$ | $2^{-4}$ | $2^{-5}$ | $2^{-6}$ | ($\times 2^{-1}$) | 0 | 0 | 0 | 1 |
| $2^{7}$ ($\times 2^{0}$) | $2^0$ | $2^{-1}$ | $2^{-2}$ | $2^{-3}$ | $2^{-4}$ | $2^{-5}$ | $2^{-6}$ | $2^{-7}$ | ($\times 2^{0}$) | 0 | 0 | 0 | 0 |

SIZFAC BITS:     $2^7\ 2^6\ 2^5\ 2^4\ 2^3\ 2^2\ 2^1\ 2^0$    $2^{-1}\ 2^{-2}\ 2^{-3}\ 2^{-4}\ 2^{-5}\ 2^{-6}\ 2^{-7}\ 2^{-8}$

-continued

CALCULATING NSHIFT

| ACCUMULATOR BITS: | $2^F 2^E 2^D 2^C 2^B 2^A 2^9 2^8$ | $2^7 2^6 2^5 2^4 2^3 2^2 2^1 2^0$ | $2^{-1} 2^{-2} 2^{-3} 2^{-4} 2^{-5} 2^{-6} 2^{-7} 2^{-8}$ |
|---|---|---|---|

16 BITS: 8 FRACTIONAL
24 BITS: 8 FRACTIONAL

The above table lists the shift controls required to effect the appropriate normalized accumulator value.

Control logic 536 state sequencer is used to generate control signals which setup and initialize the pixel processor at the beginning of each line of pixel calculations. The sequencer is initialized once per line at the occurrence of the TIME ZERO signal. The state sequencer is comprised of a ten bit counter and a 1K×8 registered PROM. Upon initialization of the state counter at the start of the horizontal blanking interval, the sequencer will generate the necessary control signals for the pixel processor every 25 nsecs.

The initialization sequence begins with the setting of the pixel processor mode control lines to disable the processor from requesting or generating pixels. This mode continues until 100 pixel clock periods have passed to allow time for the buffer memories to be initialized before pixel processing begins. By this time, the buffer memory will be ready to output and accept valid pixel data and initialization of pixel processor parameters is begun.

Several operations are involved in the initialization process. The preloaded values of INSFAC, SIZFAC and NSHIFT are latched into the active registers to be used in the next pixel calculations. The data path from the initial INSEG and initial OUTSEG registers to the active INSEG and OUTSEG registers is selected to load the registers with their initial starting values. A request for two input pixels is made to prefetch the current and next pixel values so that these values are ready for the pixel averaging pipeline. The line buffer address counters are loaded with their starting address and read/write control bits.

Once the pixel processor has been initialized, the state sequencer enables the pixel calculations to be performed and pixel processing begins. After 1536 pixels have been processed, the state sequencer disables pixel processing until the next initialization sequence.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A computer-controlled imaging system for providing a realistic three-dimensional scene on a two-dimensional medium comprising:
    (a) a gaming area data base storage means (15) for storing coordinate locations and identifications of a plurality of objects comprising a scene;
    (b) an object data base comprising a multiplicity of digital mass storage means (34, 36, 38, 40) for storing data representative of said objects as viewed for a multiplicity of aspect angles;
    (c) master visual computer means (12) for determining position and orientation of an imaginary observer relative to said gaming area;
    (d) field-of-view computing means (10) operatively coupled to said master visual computer means (12) and said gaming area data base storage means (15) for developing digital control words specifying identity, size, rotation and aspect of each object present in said observer's field-of-view;
    (e) a plurality of channels (64), at least one channel for sequentially processing a plurality of objects one at a time within one video frame and providing predetermined translation and occlusion between said objects, said at least one channel including:
        (i) predetermined ones of said digital mass storage means (34, 36, 38, 40) of said object data base;
        (ii) multiple object memory means (52) for temporarily storing data representative of all selected objects required for said channel to compose an assigned portion of the resultant scene, and read from said object data base mass storage means;
        (iii) means (42, 44, 48) for coupling said object data base mass storage means (34, 36, 38, 40) to said multiple object memory means (52), said coupling means (42, 44, 48) operating under control of said field-of-view computing means (10) to select and buffer data representative of objects identified by the FOV computer from the mass storage means for presentation to the multiple object memory;
        (iv) pipeline processing means (54) operable at a video rate under control of said field-of-view computing means (10) for transforming said data representative of selected objects read from said multiple object memory means (52) so as to represent the same object but having a size and orientation as required for a constructed scene;
        (v) scene memory means (16) and range memory means (18) for storing a raster representation of a current scene being constructed; and
        (vi) memory mapper means (58) coupled to said field-of-view computing means and coupling said scene memory means (16) for entering objects into said range memory means and scene memory means in a region corresponding to the coordinate location of said objects with predetermined translation and occlusion as determined by input data received from said field-of-view computing means.

2. The computer-controlled imaging system as in claim 1 and further including:
    (a) scene construction means (20) coupled to receive signals comprising said raster representation of a current scene from said range memory means (18) and said scene memory means (16) in each of said plurality of channels (64) for creating a composite scene whereby objects present in individual scenes of each channel are appropriately occluded in said composite scene.

3. The computer-controlled imaging system as in claim 2 and further including means (66, 78, 80, 82, 84)

for providing data required to add computer generated imagery into said composite scene.

4. The computer-controlled imaging system as in claim 3 wherein said computer generated imagery includes predetermined special video generated effects such as smoke, fog, haze, shadow and dust.

5. The computer-controlled imaging system as in claim 2 wherein said scene construction means includes means for receiving image and range data from said plurality of channels, and means for combining said image data on a pixel-by-pixel basis for forming a scene.

6. The computer-controlled imaging system as in claim 1 wherein object data stored in said data base storage means (34, 36, 38, 40) define images having variable spatial resolution and said pipeline processing means (54) effects compression in size of said images under control of said field-of-view computing means, the degree of compression of each image being dependent upon the location of that image within the scene.

7. The computer-controlled imaging system as in claim wherein said pipeline processing means in each of said plurality of channels simultaneously processes data pertaining to a selectable variable number of said plurality of objects.

8. The computer-controlled imaging system as in claim 1 wherein said data representative of objects stored in said multiple object memory means (52) defining a given object are repeatedly warped (i.e. rotated, translated and compressed) a plurality of times corresponding to the number of times said given object appears in a composite scene.

* * * * *